(12) United States Patent
Noguchi

(10) Patent No.: US 10,438,411 B2
(45) Date of Patent: Oct. 8, 2019

(54) DISPLAY CONTROL METHOD FOR DISPLAYING A VIRTUAL REALITY MENU AND SYSTEM FOR EXECUTING THE DISPLAY CONTROL METHOD

(71) Applicant: COLOPL, Inc., Tokyo (JP)

(72) Inventor: Yasuhiro Noguchi, Tokyo (JP)

(73) Assignee: COLOPL, INC., Tokyo (JP)

( * ) Notice: Subject to any disclaimer, the term of this patent is extended or adjusted under 35 U.S.C. 154(b) by 0 days.

(21) Appl. No.: 15/480,315

(22) Filed: Apr. 5, 2017

(65) Prior Publication Data

US 2017/0294048 A1 Oct. 12, 2017

(30) Foreign Application Priority Data

Apr. 6, 2016 (JP) .................................. 2016-076709

(51) Int. Cl.
| | |
|---|---|
| *G06T 19/00* | (2011.01) |
| *G06F 3/0481* | (2013.01) |
| *G06F 3/01* | (2006.01) |
| *G06F 3/0482* | (2013.01) |
| *G02B 27/01* | (2006.01) |

(52) U.S. Cl.
CPC ............ *G06T 19/006* (2013.01); *G06F 3/011* (2013.01); *G06F 3/012* (2013.01); *G06F 3/0482* (2013.01); *G06F 3/04812* (2013.01); *G06F 3/04815* (2013.01); *G02B 27/017* (2013.01)

(58) Field of Classification Search
CPC .... G06F 3/011; G06F 3/04815; G06T 19/003; G06T 19/006
See application file for complete search history.

(56) References Cited

U.S. PATENT DOCUMENTS

| | | | | |
|---|---|---|---|---|
| 2015/0187357 A1* | 7/2015 | Xia | .......................... | G06F 1/163 704/275 |
| 2015/0277555 A1* | 10/2015 | Morishita | ................ | G06F 3/011 345/156 |
| 2016/0005263 A1* | 1/2016 | Keilwert | .............. | G07F 17/3211 463/33 |

(Continued)

FOREIGN PATENT DOCUMENTS

JP 5767386 B1 8/2015

*Primary Examiner* — Ryan McCulley
(74) *Attorney, Agent, or Firm* — Hauptman Ham, LLP

(57) ABSTRACT

A display control method includes generating virtual space data representing a virtual space in which a virtual camera is arranged. The method further includes moving a visual field of the virtual camera along with movement of a head-mounted display (HMD). The method further includes generating visual-field image data based on the visual field of the virtual camera and the virtual space data. The method further includes displaying a visual-field image on the HMD based on the visual-field image data. The method further includes identifying a relative position relationship between the HDM and a user's hand. The method further includes determining whether or not a detected movement of the hand satisfies a first condition. The method further includes displaying a menu object in the visual field of the virtual camera based on the relative position relationship when the detected movement of the hand satisfies the first condition.

18 Claims, 25 Drawing Sheets

(56) References Cited

U.S. PATENT DOCUMENTS

| | | | | |
|---|---|---|---|---|
| 2016/0011724 A1* | 1/2016 | Wheeler | ............... | G06F 3/0482 |
| | | | | 715/822 |
| 2016/0026253 A1* | 1/2016 | Bradski | ............... | G02B 27/225 |
| | | | | 345/8 |
| 2016/0054791 A1* | 2/2016 | Mullins | ................. | G04G 21/00 |
| | | | | 345/173 |
| 2016/0054797 A1* | 2/2016 | Tokubo | ................. | G06F 3/012 |
| | | | | 345/633 |
| 2017/0092002 A1* | 3/2017 | Mullins | ................ | G06T 19/006 |
| 2018/0032144 A1* | 2/2018 | Horowitz | ................ | G06T 7/251 |

* cited by examiner

DISPLAY CONTROL METHOD FOR DISPLAYING A VIRTUAL REALITY MENU AND SYSTEM FOR EXECUTING THE DISPLAY CONTROL METHOD

RELATED APPLICATIONS

The present application claims priority to Japanese Patent Application Number 2016-076709 filed Apr. 6, 2016, the disclosure of which is hereby incorporated by reference herein in its entirety.

BACKGROUND

This disclosure relates to a display control method and a system for executing the display control method.

There is known a head-mounted display (HMD), which is worn on a head of a user and capable of displaying a virtual space image as a virtual space such as a virtual reality (VR) space. In Japanese Patent No. 5767386, there is described a configuration in which a menu image is displayed when a user wearing an HMD looks upward, whereas the menu image is hidden when the user looks downward.

In the technique described in Japanese Patent No. 5767386, the menu image is displayed only when an inclination of the HMD satisfies a predetermined condition.

SUMMARY

This disclosure helps to provide a display control method capable of improving convenience of a user in a virtual space. Further, this disclosure includes a system for executing the display control method.

According to at least one embodiment of this disclosure, there is provided a display control method, which is performed in a system including a head-mounted display and a position sensor configured to detect positions of the head-mounted display and a hand of a user.

The display control method includes generating virtual space data representing a virtual space in which a virtual camera is arranged. The method further includes moving a visual field of the virtual camera along with movement of the head-mounted display. The method further includes generating visual-field image data based on the visual field of the virtual camera and the virtual space data. The method further includes displaying a visual-field image on the head-mounted display based on the visual-field image data. The method further includes identifying a relative positional relationship between the head-mounted display and the hand. The method further includes determining whether or not movement of the hand satisfies a first condition. The method further includes displaying a menu object in the visual field of the virtual camera based on the relative positional relationship when it is determined that the movement of the hand satisfies the first condition.

According to this disclosure, the display control method helps to improve the convenience of the user in the virtual space.

DETAILED DESCRIPTION

Figure 1:
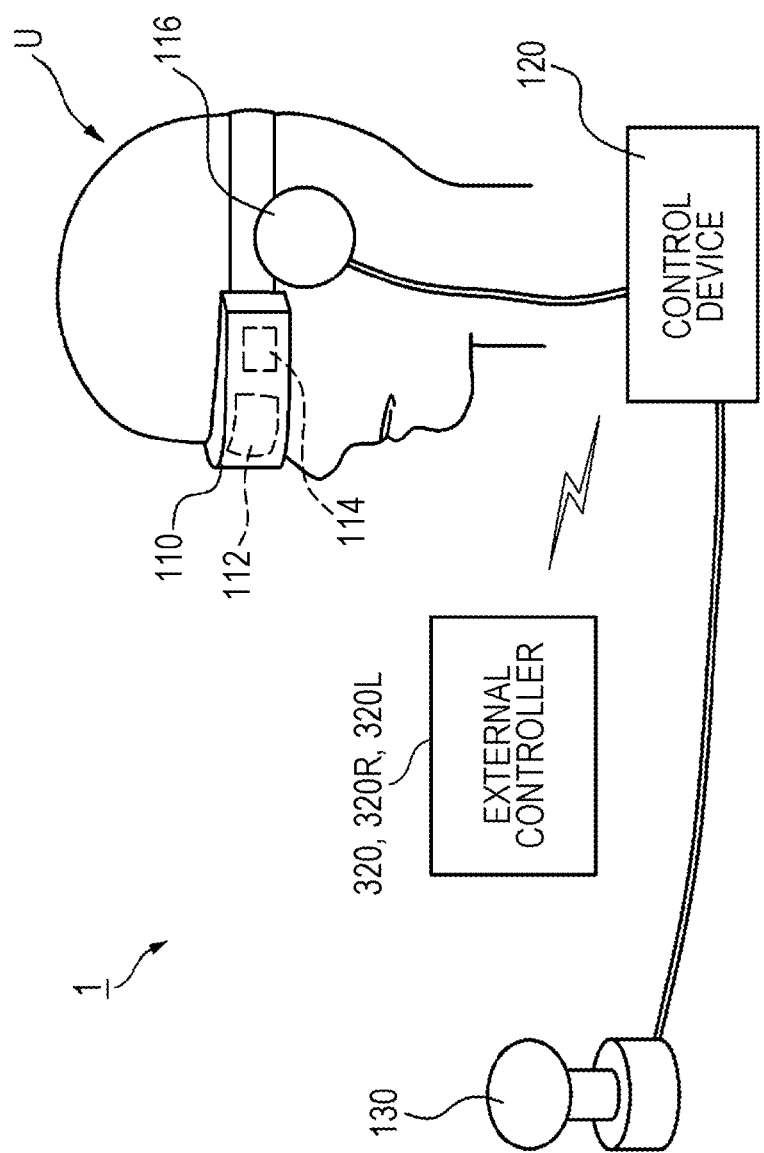
FIG. 1 is a schematic diagram of a head-mounted display (HMD) system according to at least one embodiment of this disclosure.

A summary of at least one embodiment of this disclosure is described.

(1) A display control method, which is performed in a system including a head-mounted display and a position sensor configured to detect positions of the head-mounted display and a hand of a user. The display control method includes generating virtual space data representing a virtual space in which a virtual camera is arranged. The method further includes moving a visual field of the virtual camera along with movement of the head-mounted display. The method further includes generating visual-field image data based on the visual field of the virtual camera and the virtual space data. The method further includes displaying a visual-field image on the head-mounted display based on the visual-field image data. The method further includes identifying a relative positional relationship between the head-mounted display and the hand. The method further includes determining whether or not movement of the hand satisfies a first condition. The method further includes displaying a menu object in the visual field of the virtual camera based on the relative positional relationship when it is determined that the movement of the hand satisfies the first condition.

According to the method described above, when the movement of the hand of the user satisfies the first condition, the menu object is displayed in the visual field of the virtual camera based on the relative positional relationship between the head-mounted display and the hand of the user, and the menu object is displayed in the visual-field image displayed on the head-mounted display. In this manner, the menu object is displayed in association with the movement of the hand of the user, and thus the user can display the menu object in the visual-field image intuitively. Therefore, the display control method is capable of improving convenience of the user in the virtual space.

(2) A display control method according to Item (1), further including determining a distance between the menu object and the virtual camera in accordance with the relative positional relationship. Displaying the menu object in the visual field of the virtual camera is based on the determined distance between the menu object and the virtual camera.

According to the method described above, the distance between the menu object and the virtual camera is determined based on the relative positional relationship between the head-mounted display and the hand of the user. Then, the menu object is displayed in the visual field of the virtual camera based on the determined distance, and the menu object is displayed in the visual-field image based on the determined distance. In this manner, the size of the menu object to be displayed in the visual-field image can be adjusted based on the relative positional relationship between the head-mounted display and the hand of the user, and thus the convenience of the user in the virtual space is improved.

(3) A display control method according to Item (1) or (2), further including arranging a finger object in the virtual space based on states of fingers of the user and the relative positional relationship. Displaying the menu object in the visual field of the virtual camera in such a manner that the finger object and the menu object are in contact with each other.

According to the method described above, the menu object is displayed in the visual field of the virtual camera in such a manner that the finger object and the menu object are in contact with each other, and is displayed in the visual-field image in such a manner that the finger object and the menu object are in contact with each other.

In this manner, the user can display the menu object in the visual-field image intuitively, and the convenience of the user in the virtual space is improved.

(4) A display control method according to any one of Items (1) to (3), the method further including determining whether or not a movement amount of the hand in a first direction is equal to or more than a first movement amount. The method further includes displaying the menu object in the visual field of the virtual camera when the movement amount of the hand in the first direction is equal to or more than the first movement amount. The method further includes determining whether or not a movement amount of the hand in a second direction, which is a direction different from the first direction, is equal to or more than a second movement amount. The method further includes hiding the menu object from the visual field of the virtual camera when the movement amount of the hand in the second direction is equal to or more than the second movement amount.

According to the method described above, the menu object is displayed in the visual field of the virtual camera when the movement amount of the hand in the first direction is equal to or more than the first movement amount, whereas the menu object is hidden when the movement amount of the hand in the second direction is equal to or more than the second movement amount. In short, the menu object can be displayed in the visual-field image in accordance with the movement amount of the hand in the first direction, whereas the menu object can be hidden from the visual-field image in accordance with the movement amount of the hand in the second direction. In this manner, the menu object can be displayed/hidden in association with the movement of the hand of the user, and thus the user can display the menu object in the visual-field image intuitively. Therefore, the display control method is capable of improving the convenience of the user in the virtual space.

(5) A display control method according to any one of Items (1) to (4), further includes determining whether or not the menu object is positioned outside the visual field of the virtual camera. The method further includes moving the menu object such that at least a part of the menu object is arranged in the visual field of the virtual camera when the menu object is positioned outside the visual field of the virtual camera.

According to the method described above, the menu object is moved such that at least a part of the menu object is arranged in the visual field of the virtual camera when the menu object is positioned outside the visual field of the virtual camera. In this manner, displaying the menu object in the visual-field image is possible without an additional user operation by moving the menu object such that the menu object is positioned in the visual field even when the menu object is not displayed temporarily in the visual-field image due to movement of the head-mounted display. In other words, there is no need for an additional operation for displaying the menu object in the visual-field image every time the menu object is not displayed temporarily in the visual-field image due to movement of the head-mounted display. In this manner, the convenience of the user in the virtual space is improved.

(6) A display control method according to any one of Items (1) to (5), further includes moving the menu object along with movement of the visual field of the virtual camera such that the menu object is positioned at a predetermined position in the visual field of the virtual camera when the menu object is arranged in the visual field of the virtual camera.

According to the method described above, the menu object is moved along with movement of the visual field of the virtual camera such that the menu object is positioned at the predetermined position in the visual field of the virtual camera. In this manner, displaying the menu object at the predetermined position in the visual-field image is possible without an additional user operation. In other words, there is no need for an additional operation for displaying the menu object at the predetermined position in the visual-field image every time the head-mounted display moves. In this manner, the convenience of the user in the virtual space is improved.

(7) A system for executing the display control method of any one of Items (1) to (6).

According to the method described above, the system is capable of improving the convenience of the user in the virtual space.

At least one embodiment of this disclosure is described below with reference to the drawings. Once a component is described in this description of at least one embodiment, a description on a component having the same reference number as that of the already described component is omitted for the sake of convenience.

FIG. 1 is a schematic diagram of a head mounted display (hereinafter simply referred to as "HMD") system 1 according to at least one embodiment of this disclosure. In FIG. 1, the HMD system 1 includes an HMD 110 worn on a head of a user U, a position sensor 130, a control device 120, and an external controller 320.

The HMD 110 includes a display unit 112, an HMD sensor 114, and headphones 116. The headphones 116 may not be included in the HMD 110. Instead, a speaker or headphones separate from the HMD 110 may be used.

The display unit 112 includes a non-transmissive (or partially transmissive) display device configured to completely cover a field of view (visual field) of the user U wearing the HMD 110. With this, the user U can see a visual-field image displayed on the display unit 112, and hence the user U can be immersed in the virtual space. The display unit 112 may include a left-eye display unit in which an image for a left eye of the user U is projected, and a right-eye display in which an image for a right eye of the user U is projected.

The HMD sensor 114 is mounted near the display unit 112 of the HMD 110. The HMD sensor 114 includes at least one of a geomagnetic sensor, an acceleration sensor, or an inclination sensor (for example, an angular velocity sensor or a gyro sensor), and can detect various movements of the HMD 110 worn on the head of the user U.

The position sensor 130 is constructed of, for example, a position tracking camera, and is configured to detect the positions of the HMD 110 and the hand of the user U (the position of the external controller 320). The position sensor 130 is connected to the control device 120 so as to enable communication to/from the control device 120 in a wireless or wired manner. The position sensor 130 is configured to detect information relating to positions, inclinations, or light emitting intensities of a plurality of detection points (not shown) provided in the HMD 110. Further, the position sensor 130 is configured to detect information relating to positions, inclinations, and/or light emitting intensities of a plurality of detection points 304 (refer to FIG. 4) provided in the external controller 320. The detection points are, for example, light emitting portions configured to emit infrared light or visible light. Further, the position sensor 130 may include an infrared sensor or a plurality of optical cameras.

The control device 120 is capable of acquiring information of the position of the HMD 110 based on the information acquired from the position sensor 130, and accurately associating the position of the virtual camera in the virtual space with the position of the user U wearing the HMD 110 in the real space based on the acquired information of the position of the HMD 110. Further, the control device 120 is capable of acquiring information of the position of the external controller 320 based on the information acquired from the position sensor 130, and accurately associating the position of a finger object (to be described later) to be displayed in the virtual space with a relative position relationship between the external controller 320 and the HMD 110 in the real space based on the acquired information of the position of the external controller 320.

Figure 2:
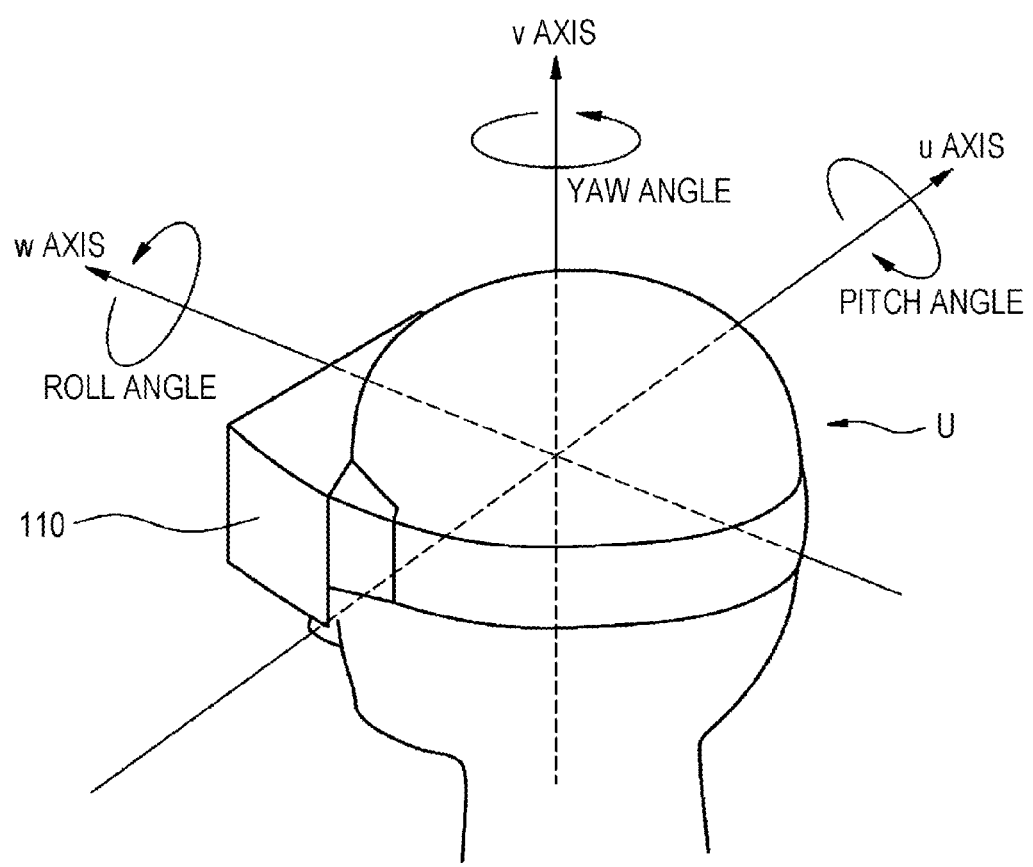
FIG. 2 is a diagram of a head of a user wearing an HMD according to at least one embodiment of this disclosure.

Next, with reference to FIG. 2, a method of acquiring information relating to a position and an inclination of the HMD 110 is described. FIG. 2 is a diagram of the head of the user U wearing the HMD 110. The information relating to the position and the inclination of the HMD 110, which are synchronized with the movement of the head of the user U wearing the HMD 110, can be detected by the position sensor 130 and/or the HMD sensor 114 mounted on the HMD 110. In FIG. 2, three-dimensional coordinates (uvw coordinates) are defined about the head of the user U wearing the HMD 110. A perpendicular direction in which the user U stands upright is defined as a v axis, a direction being orthogonal to the v axis and connecting the center of the display unit 112 and the user U is defined as a w axis, and a direction orthogonal to the v axis and the w axis is defined as a u axis. The position sensor 130 and/or the HMD sensor 114 are/is configured to detect angles about the respective uvw axes (that is, inclinations determined by a yaw angle representing the rotation about the v axis, a pitch angle representing the rotation about the u axis, and a roll angle representing the rotation about the w axis). The control device 120 is configured to determine angular information for controlling a visual axis of the virtual camera, which is configured to define visual-field information, based on the detected change in angles about the respective uvw axes.

Figure 3:
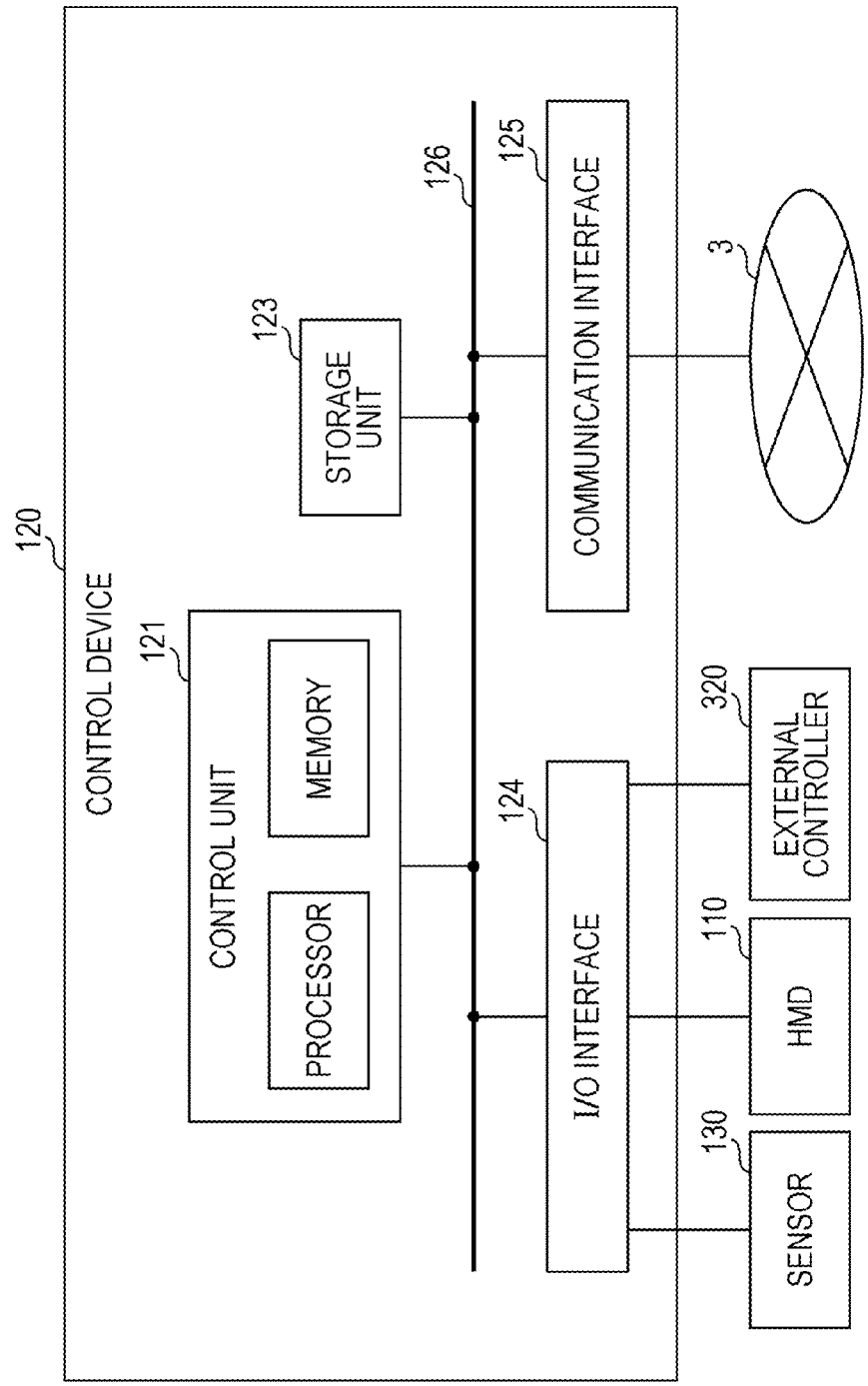
FIG. 3 is a diagram of a hardware configuration of a control device according to at least one embodiment of this disclosure.

Next, with reference to FIG. 3, a hardware configuration of the control device 120 is described. FIG. 3 is a diagram of a hardware configuration of the control device 120. As illustrated in FIG. 3, the control device 120 includes a control unit 121, a storage unit 123, an input/output (I/O) interface 124, a communication interface 125, and a bus 126. The control unit 121, the storage unit 123, the I/O interface 124, and the communication interface 125 are connected to each other via the bus 126 so as to enable communication therebetween.

The control device 120 may be constructed as a personal computer, a tablet computer, or a wearable device separately from the HMD 110, or may be built into the HMD 110. Further, a part of the functions of the control device 120 may be mounted to the HMD 110, and the remaining functions of the control device 120 may be mounted to another device separate from the HMD 110.

The control unit 121 includes a memory and a processor. The memory is constructed of, for example, a read only memory (ROM) having various programs and the like stored therein and a random access memory (RAM) having a plurality of work areas in which various programs to be executed by the processor are stored. The processor is constructed of, for example, a central processing unit (CPU), a micro processing unit (MPU) and/or a graphics processing unit (GPU), and is configured to develop, on the RAM, programs designated by various programs installed into the ROM to execute various types of processing in cooperation with the RAM.

In particular, the control unit 121 may control various operations of the control device 120 by causing the processor to develop, on the RAM, display control instructions (to be described later) for causing a computer to execute the display control method according to at least one embodiment to execute the instructions in cooperation with the RAM. The control unit 121 executes a predetermined application (game program) stored in the memory or the storage unit 123 to provide a virtual space (visual-field image) on the display unit 112 of the HMD 110. With this, the user U can be immersed in the virtual space provided on the display unit 112.

The storage unit (storage) 123 is a storage device, for example, a hard disk drive (HDD), a solid state drive (SSD), or a USB flash memory, and is configured to store programs and various types of data. The display control instructions may be incorporated in the storage unit 123. Further, the storage unit 123 may store instructions for authentication of the user and game programs including data relating to various images and objects. Further, a database including tables for managing various types of data may be constructed in the storage unit 123.

The I/O interface 124 is configured to connect each of the position sensor 130, the HMD 110, and the external controller 320 to the control device 120 so as to enable communication therebetween, and is constructed of, for example, a universal serial bus (USB) terminal, a digital visual interface (DVI) terminal, or a high-definition multimedia interface (R) (HDMI) terminal. The control device 120 may be wirelessly connected to each of the position sensor 130, the HMD 110, and the external controller 320.

The communication interface 125 is configured to connect the control device 120 to a communication network 3, for example, a local area network (LAN), a wide area network (WAN), or the Internet. The communication interface 125 includes various wire connection terminals and various processing circuits for wireless connection for communication to/from an external device via the communication network 3, and is configured to adapt to communication standards for communication via the communication network 3.

Figure 4:
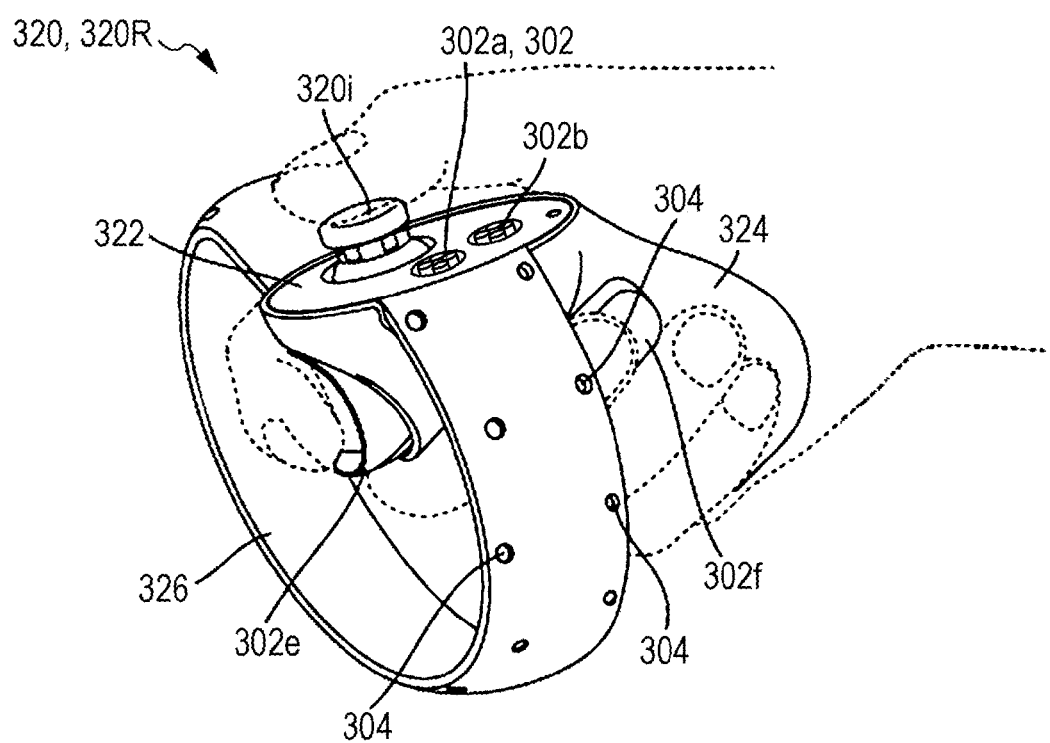
FIG. 4 is a diagram of an example of a configuration of an external controller according to at least one embodiment of this disclosure.

Next, an example of a configuration of the external controller 320 is described with reference to FIG. 4. The external controller 320 is used by the user U to control an action of the finger object to be displayed in the virtual space. The external controller 320 may include a right-hand external controller 320R to be used by the user U with the right hand, and a left-hand external controller 320L to be used by the user U with the left hand. The right-hand external controller 320R is a device configured to indicate the position of the right hand and the movement of the fingers of the right hand of the user U. The left-hand external controller 320L is a device configured to indicate the position of the left hand and the movement of the fingers of the left hand of the user U. The right-hand external controller 320R and the left-hand external controller 320L have substantially the same configuration. Thus, in the following, only the right-hand external controller 320R (hereinafter simply referred to as "controller 320R") is described. In FIG. 4, an example of a specific configuration of the controller 320R is illustrated.

The controller 320R includes an operation button 302, a plurality of detection points 304, a sensor (not shown), and a transceiver (not shown). The controller 320R may include only one of the detection point 304 and the sensor. The operation button 302 is a group of a plurality of buttons configured to receive operation input from the user U. The operation button 302 includes a push button, a trigger button, and an analog stick. The push button is a button configured to be operated by an action of pressing the button with the thumb. For example, two push buttons 302a and 302b are arranged on a top surface 322. The trigger button is a button configured to be operated by an action of, for example, pulling a trigger with the index finger or the middle finger. For example, a trigger button 302e and a trigger button 302f are arranged on a front surface and a side surface of a grip 324, respectively. The trigger buttons 302e and 302f are assumed to be operated with the index finger and the middle finger, respectively. The analog stick is a stick button capable of being operated by being tilted in an arbitrary direction by 360 degrees from a predetermined neutral position. For example, an analog stick 320i is arranged on the top surface 322 and is assumed to be operated with the thumb.

The controller 320R includes a frame 326 extending in a direction opposite to the top surface 322 from both side surfaces of the grip 324 to form a semicircular ring. The plurality of detection points 304 are embedded in an outer surface of the frame 326. The plurality of detection points 304 are, for example, a plurality of infrared LEDs arranged in one row along a circumferential direction of the frame 326. After the position sensor 130 detects information on position, inclination, or luminance of the plurality of detection points 304, the control device 120 acquires information on a position and attitude (inclination and orientation) of the controller 320R based on the information detected by the position sensor 130.

The sensor of the controller 320R may be, for example, any one of a magnetic sensor, an angular velocity sensor, an acceleration sensor, or a combination thereof. When the user U holds and moves the controller 320R, the sensor outputs values (magnetic, angular velocity, or acceleration values) depending on the orientation and movement of the controller 320R. The control device 120 acquires information on the position and attitude of the controller 320R based on the values output from the sensor.

The transceiver of the controller 320R is configured to transmit and receive data between the controller 320R and the control device 120. For example, the transceiver transmits to the control device 120 an operation signal corresponding to operation input given by the user U to the controller 320R via the operation button 302. In addition, the transceiver receives from the control device 120 a command signal instructing the controller 320R to cause emission of light from the detection point 304. Further, the transceiver transmits a signal corresponding to various values detected by the sensor to the control device 120.

Figure 5:
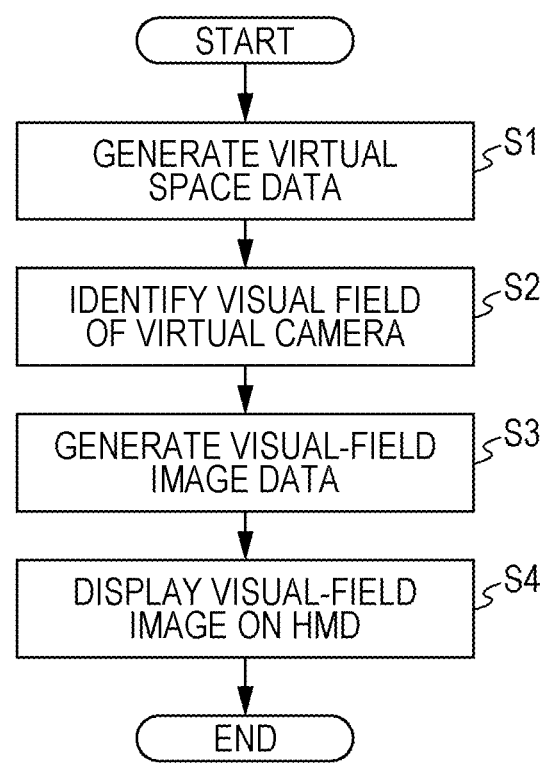
FIG. 5 is a flow chart of a method of displaying a visual-field image on the HMD according to at least one embodiment of this disclosure.
Figure 6:
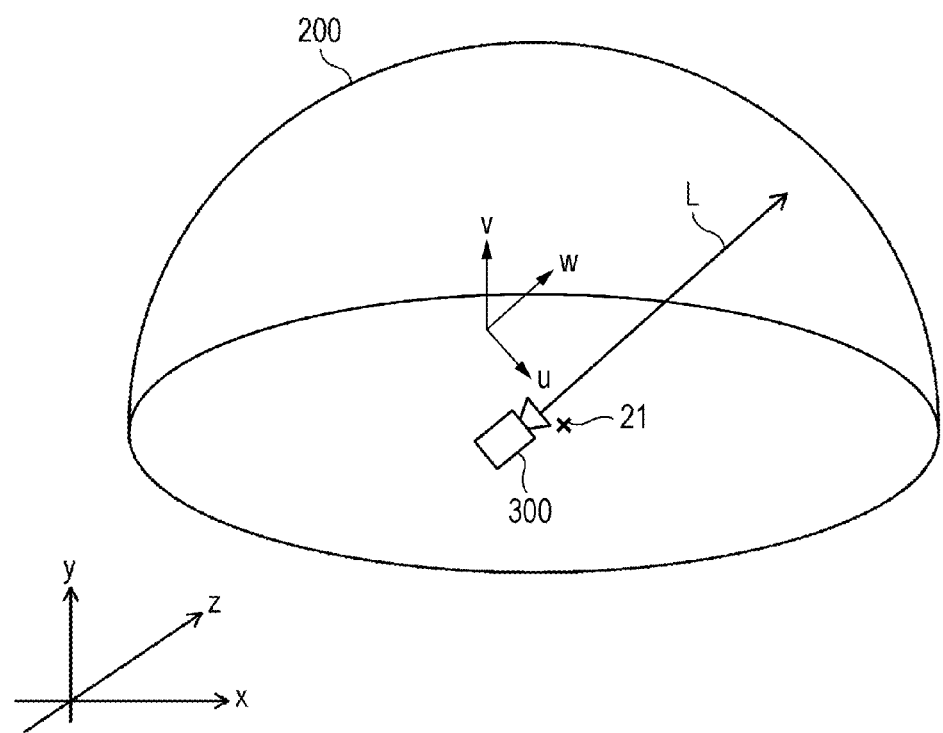
FIG. 6 is an xyz spatial diagram of an example of a virtual space according to at least one embodiment of this disclosure.
Figure 7A:
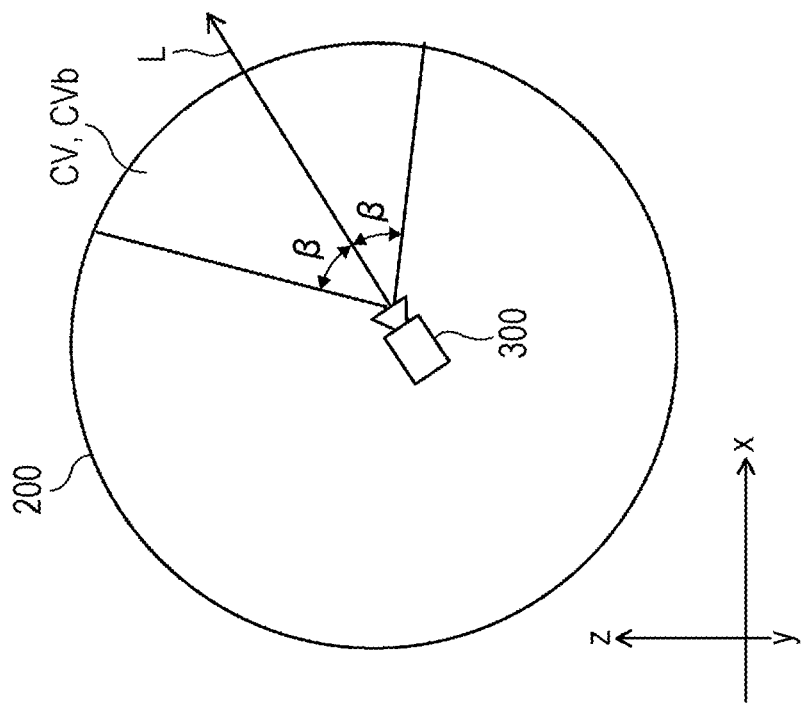
FIG. 7A is a yx plane diagram of the virtual space in FIG. 5 according to at least one embodiment of this disclosure.
Figure 7B:
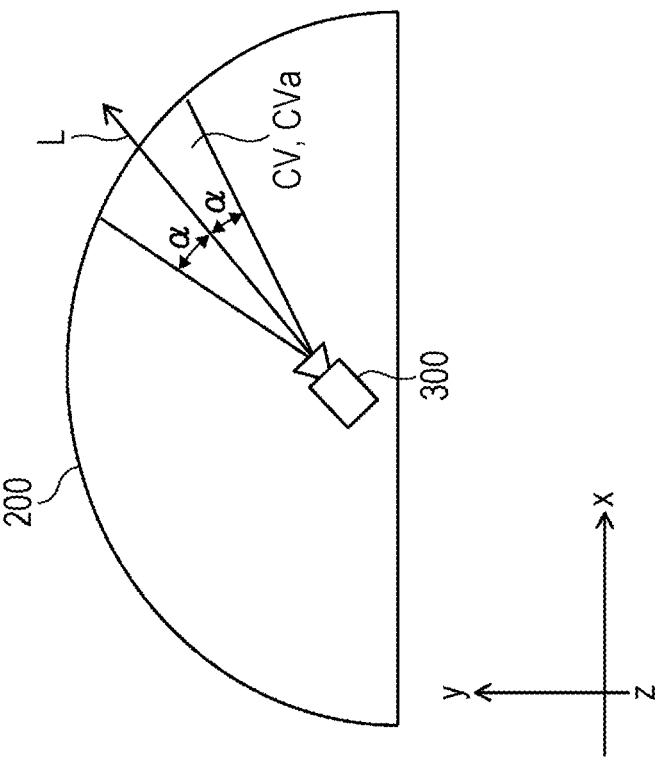
FIG. 7B is a zx plane diagram of the virtual space in FIG. 5 according to at least one embodiment of this disclosure.
Figure 8:
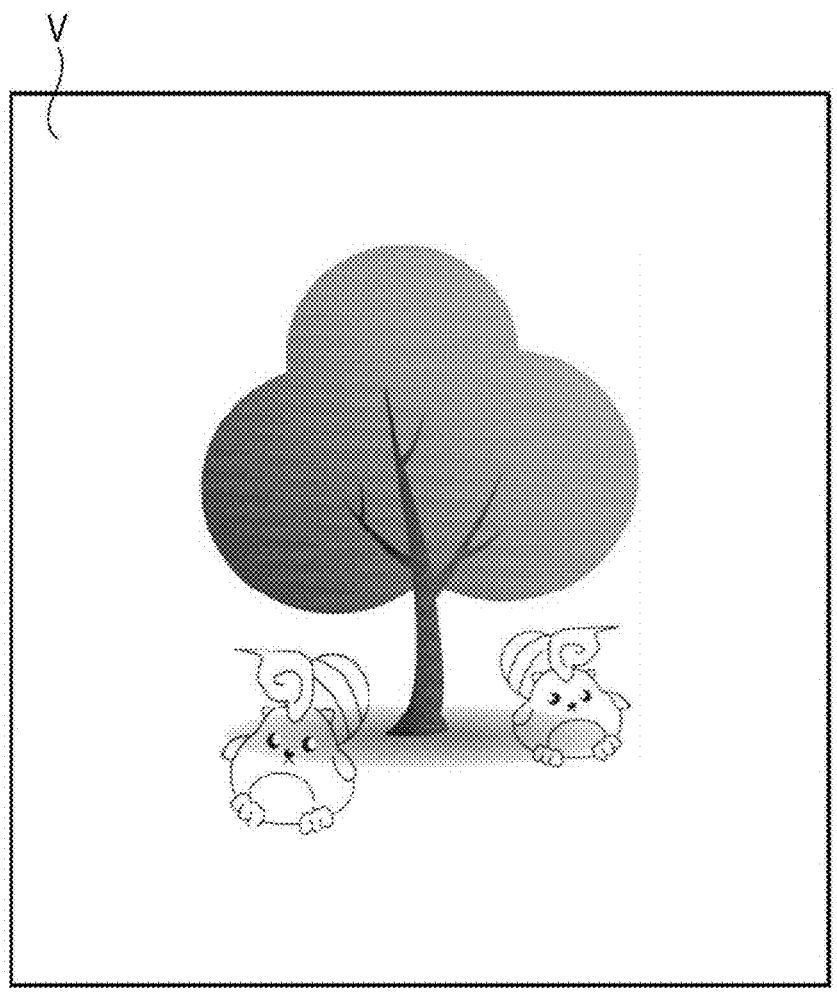
FIG. 8 is a diagram of an example of the visual-field image displayed on the HMD according to at least one embodiment of this disclosure.
Figure 8:
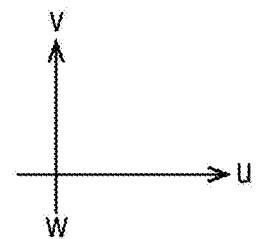

Next, with reference to FIG. 5 to FIG. 8, processing for displaying a visual-field image V (refer to FIG. 8) on the HMD 110 is described. FIG. 5 is a flow chart of a method of displaying the visual-field image V on the HMD 110. FIG. 6 is an xyz spatial diagram of an example of a virtual space 200. FIG. 7A is a yx plane diagram of the virtual space 200 in FIG. 6. FIG. 7B is a zx plane diagram of the virtual space 200 in FIG. 6. FIG. 8 is a diagram of an example of the visual-field image V displayed on the HMD 110.

In FIG. 5, in Step S1, the control unit 121 (refer to FIG. 3) generates virtual space data representing the virtual space 200 in which a virtual camera 300 is arranged. In FIG. 6, FIG. 7A, and FIG. 7B, the virtual space 200 is defined as an entire celestial sphere having a center position 21 as the center (in FIG. 6, only the upper-half celestial sphere is included). Further, in the virtual space 200, an xyz coordinate system having the center position 21 as the origin is set. In an initial state of the HMD system 1, the virtual camera 300 is arranged at the center position 21 of the virtual space 200.

The uvw coordinate system that defines the visual field of the virtual camera 300 is determined so as to synchronize with the uvw coordinate system that is defined about the head of the user U in the real space. Further, the virtual camera 300 may be moved in the virtual space 200 in synchronization with the movement of the user U wearing the HMD 110 in the real space.

Next, in Step S2, the control unit 121 identifies a visual field CV (refer to FIG. 7A and FIG. 7B) of the virtual camera 300. Specifically, the control unit 121 acquires information relating to the position and the inclination of the HMD 110 based on data representing the state of the HMD 110, which is transmitted from the position sensor 130 and/or the HMD sensor 114. Next, the control unit 121 determines the position and the direction of the virtual camera 300 in the virtual space 200 based on the information relating to the position and the inclination of the HMD 110. Next, the control unit 121 determines a reference line of sight L corresponding to the visual axis of the virtual camera 300 based on the position and the direction of the virtual camera 300, and identifies the visual field CV of the virtual camera 300 based on the determined reference line of sight L. In this case, the visual field CV of the virtual camera 300 matches a part of the region of the virtual space 200 that can be visually recognized by the user U wearing the HMD 110 (in other words, matches a part of the region of the virtual space 200 to be displayed on the HMD 110). Further, the visual field CV has a first region CVa set as an angular range of a polar angle $\alpha$ about the reference line of sight L in the xy plane in FIG. 7A, and a second region CVb set as an angular range of an azimuth $\beta$ about the reference line of sight L in the xz plane in FIG. 7B.

As described above, the control unit 121 can identify the visual field CV of the virtual camera 300 based on the data transmitted from the position sensor 130 and/or the HMD sensor 114. In this case, when the user U wearing the HMD 110 moves, the control unit 121 can change the visual field CV of the virtual camera 300 based on the data representing the movement of the HMD 110, which is transmitted from the position sensor 130 and/or the HMD sensor 114. That is, the control unit 121 can move the visual field CV along with movement of the HMD 110.

Next, in Step S3, the control unit 121 generates visual-field image data representing the visual-field image V (refer to FIG. 8) to be displayed on the display unit 112 of the HMD 110. Specifically, the control unit 121 generates the visual-field image data based on the virtual space data defining the virtual space 200 and the visual field CV of the virtual camera 300.

Next, in Step S4, the control unit 121 displays the visual-field image V on the display unit 112 of the HMD 110 based on the visual-field image data. As described above, the visual field CV of the virtual camera 300 changes in accordance with the movement of the user U wearing the HMD 110, and thus the visual-field image V to be displayed on the HMD 110 changes as well. Thus, the user U can be immersed in the virtual space 200.

The virtual camera 300 may include a left-eye virtual camera and a right-eye virtual camera. In this case, the control unit 121 generates left-eye visual-field image data representing a left-eye visual-field image based on the virtual space data and the visual field of the left-eye virtual camera, and generates right-eye visual-field image data representing a right-eye visual-field image based on the virtual space data and the visual field of the right-eye virtual camera. Then, the control unit 121 displays the left-eye visual-field image and the right-eye visual-field image on the display unit 112 of the HMD 110 based on the left-eye visual-field image data and the right-eye visual-field image data. In this manner, the user U can visually recognize the visual-field image as a three-dimensional image from the left-eye visual-field image and the right-eye visual-field image. In addition, for the sake of convenience in description, the number of the virtual cameras 300 is one herein. As a matter of course, at least one embodiment of this disclosure is also applicable to a case where the number of the virtual cameras is two.

Figure 9:
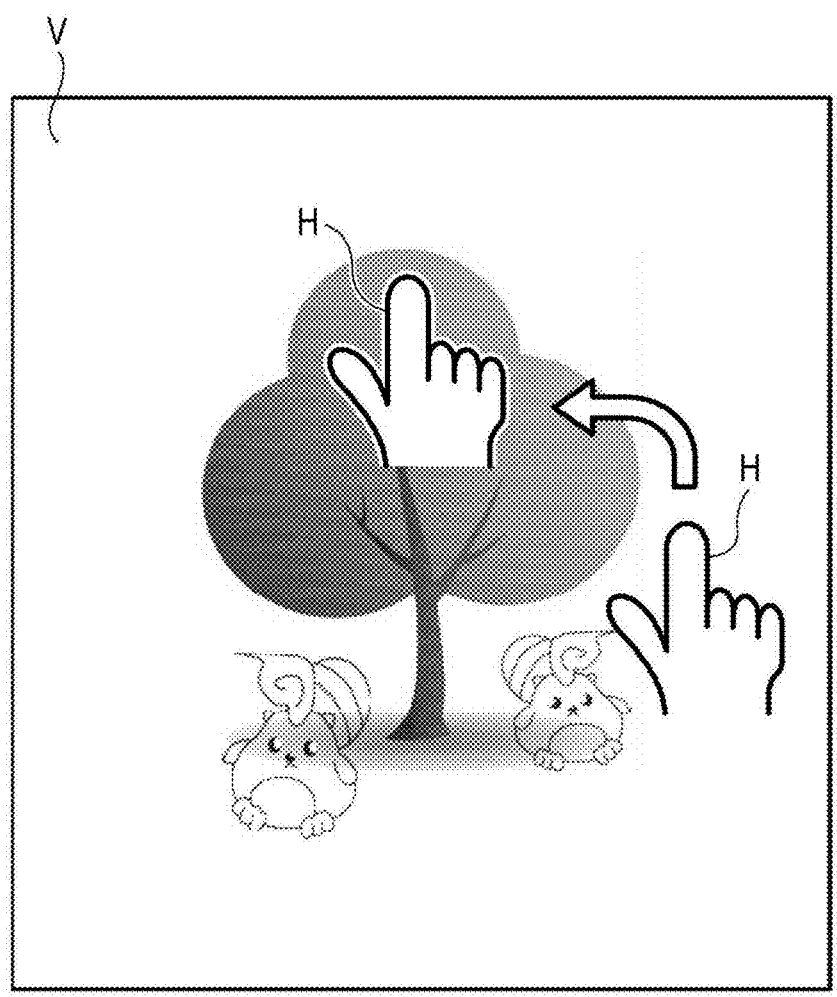
FIG. 9 is a diagram of a finger object displayed on the visual-field image according to at least one embodiment of this disclosure.
Figure 9:
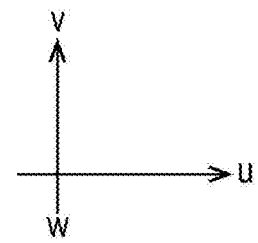

Next, with reference to FIG. 4 and FIG. 9, a description is given of a finger object H to be displayed in the virtual space 200. FIG. 9 is a diagram of a finger object H displayed on the visual-field image V. In the following, of the left-hand external controller 320L and the right-hand external controller 320R, only an operation of the right-hand external controller (controller 320R) is described.

When the finger object H is arranged in the visual field CV of the virtual camera 300, the finger object H is displayed in the visual-field image V. On the contrary, when the finger object H is arranged outside the visual field CV of the virtual camera 300, the finger object H is hidden from the visual-field image V. Further, through movement of the controller 320R in the real space, the finger object H moves within the virtual space 200 along with the movement of the controller 320R. For example, when the controller 320R is moved under a state in which the finger object H is displayed in the visual-field image V, the finger object H moves along with the movement of the controller 320R as in FIG. 9.

Further, extension of a finger of the finger object H may be adjusted in association with a pressing force of the operation button 302. For example, when the trigger button 302e is pressed, not pressed, or pressed a little, e.g., pressed about half of a maximum distance permitted by the trigger button 302e, the index finger of the finger object H may bend, extend, or bend a little, e.g. a flexed between "bend" and "extend", respectively. Further, when the trigger button 302f is pressed, the middle finger, the ring finger, and the little finger may bend all at once.

For example, the finger object H is displayed in the visual-field image V as illustrated in FIG. 9 by the user U pressing the trigger button 302f of the controller 320R with the middle finger and not pressing the trigger button 302e of the controller 320R.

Specific processing is performed as follows. The transceiver of the controller 320R transmits an operation signal indicating how the operation button 302 is pressed to the control device 120. The control unit 121 of the control device 120 determines states of fingers of the finger object H based on the received operation signal. For example, when the control device 120 receives an operation signal indicating that the trigger button 302*f* is pressed and the trigger button 302*e* is not pressed, the control unit 121 generates the finger object H as illustrated in FIG. 9 and visual-field image data containing the finger object H based on the operation signal. After that, the control unit 121 displays the visual-field image V as illustrated in FIG. 9 on the display unit 112 of the HMD 110 based on the visual-field image data. Further, when the controller 320R is moved in the real space, the position sensor 130 transmits data indicating the state of the controller 320R to the control device 120. The control unit 121 acquires information on the position and inclination of the controller 320R based on data from the position sensor 130, and determines the position and inclination of the finger object H in the virtual space 200 based on those pieces of acquired information.

Figure 10:
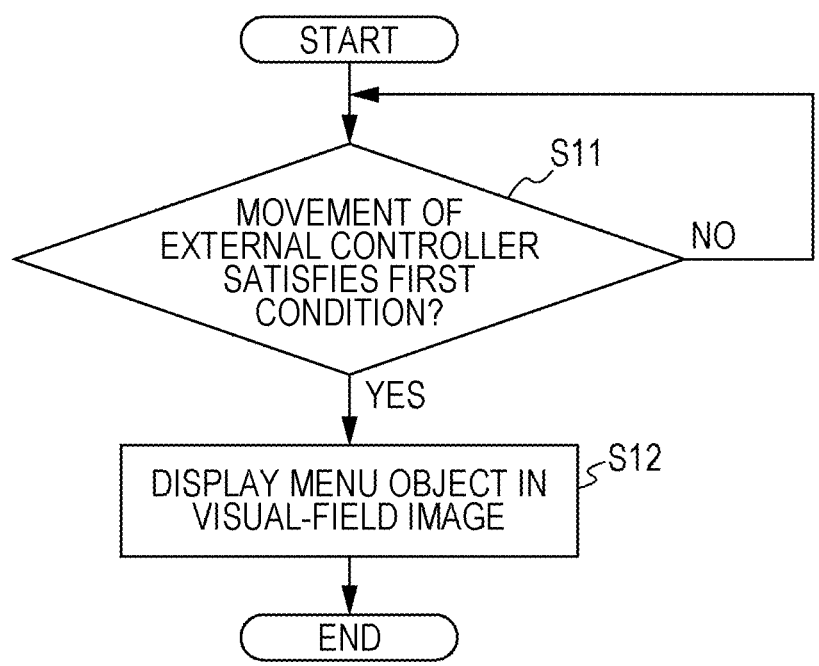
FIG. 10 is a flowchart of a method of displaying a menu object in the visual-field image according to at least one embodiment of this disclosure.
Figure 11:
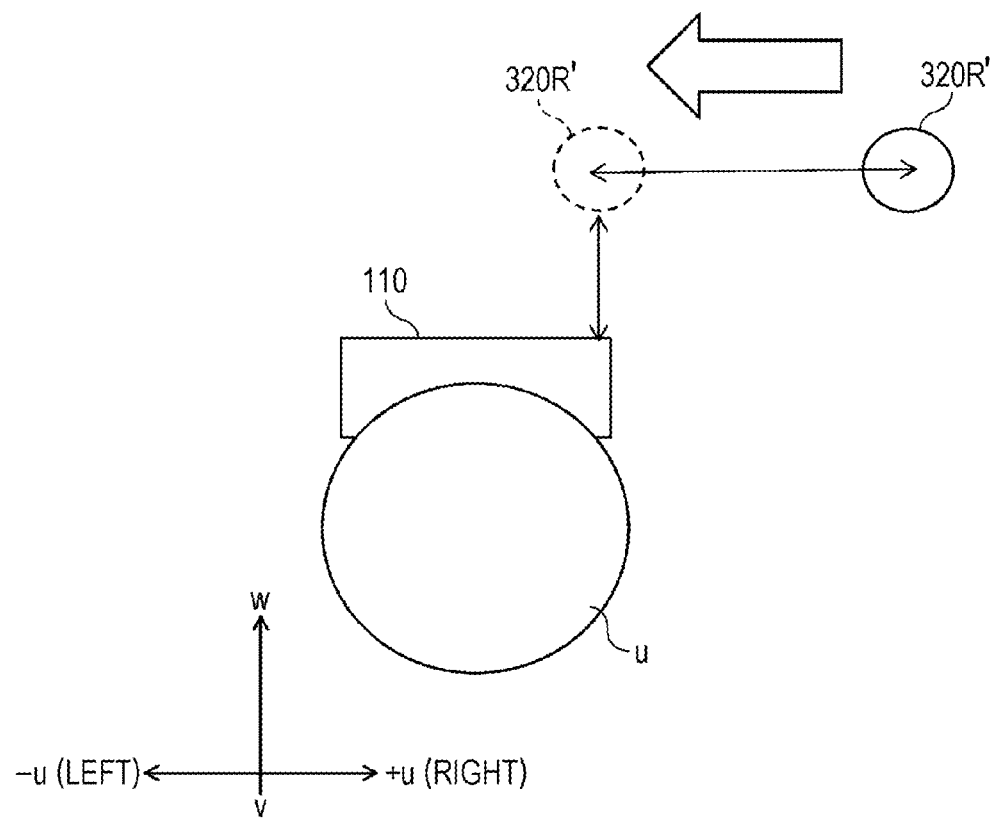
FIG. 11 is a diagram of a relative positional relationship between the HMD and the external controller, and movement of the external controller in a left direction according to at least one embodiment of this disclosure.
Figure 12:
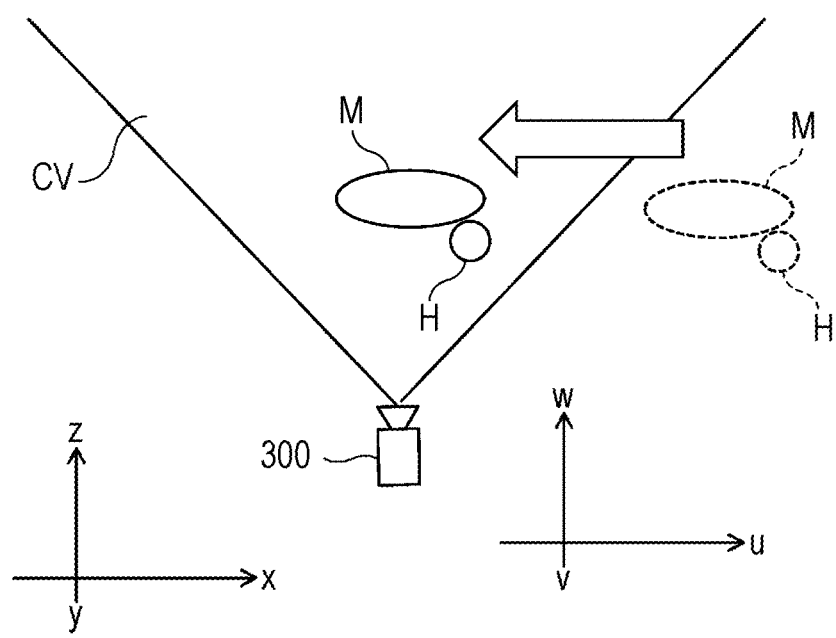
FIG. 12 is a diagram of a movement of the menu object and the finger object from outside a visual field of a virtual camera into the visual field according to at least one embodiment of this disclosure.
Figure 13:
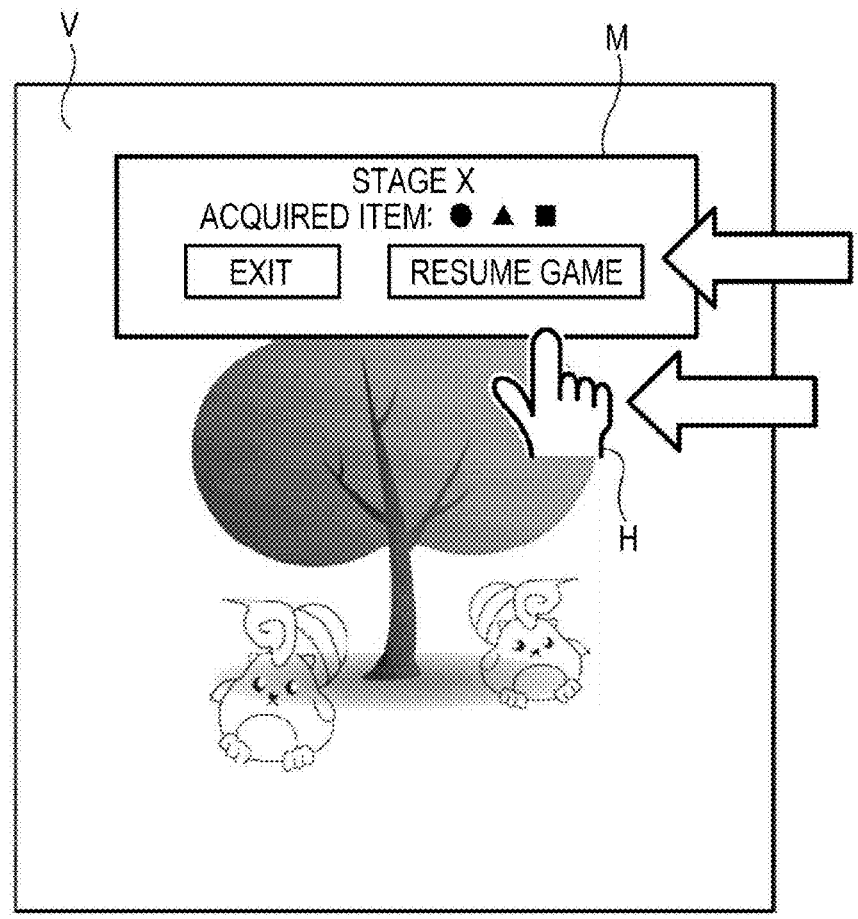
FIG. 13 is a diagram of a display of the menu object and the finger object in the visual-field image through movement of the menu object and the finger object in the left direction according to at least one embodiment of this disclosure.

Next, with reference to FIG. 10 to FIG. 13, a description is given of processing of displaying a menu object M (refer to FIG. 13) in the visual-field image V. FIG. 10 is a flow chart of a method of displaying the menu object M in the visual-field image V. FIG. 11 is a diagram of a relative position relationship between the HMD 110 and the controller 320R, and movement of the controller 320R in a left direction. FIG. 12 is a diagram of a movement of the menu object M and the finger object H from outside the visual field CV of the virtual camera 300 into the visual field CV. FIG. 13 is a diagram of a display of the menu object M and the finger object H in the visual-field image V through movement of the menu object M and the finger object H in the left direction. In FIG. 11, a uvw coordinate system is defined with the head of the user U being a center (in other words, the uvw coordinate system is defined with the HMD 110 being a reference point), and a +u (positive u) direction and a −u (negative u) direction are defined as the right direction and the left direction, respectively. Thus, when the head of the user U (or the HMD 110) moves, the uvw coordinate system also moves accordingly (for example, when the HMD 110 rotates, the uvw coordinate system also rotates accordingly). Further, in FIG. 12, an xyz coordinate system of the virtual space 200 and the uvw coordinate system of the virtual camera 300 associated with the uvw coordinates defined with the head of the user U in the real space being a center are displayed.

The menu object M is, for example, an icon, a menu screen, or a widget. In at least one embodiment, a menu screen containing stage information, acquired item information, an exit button, and a game resumption button is included as an example of the menu object M.

In FIG. 10, in Step S11, the control unit 121 determines whether or not the movement of the controller 320R satisfies a first condition. Now, in the following, an example of the first condition is described.

<First Condition>

The first condition includes a combination of a condition A and a condition B described below.

(Condition A) The trigger button 302*e* is not pressed while the trigger button 302*f* of the controller 320R is pressed (regardless of whether or not the push buttons 302*a* and 302*b* and the analog stick 302*i* are pressed at this time).

(Condition B) A movement amount of the controller 320R in the left direction (−u direction) within a predetermined period of time is equal to or more than a first movement amount.

At this time, when the controller 320R satisfies the condition A, the index finger of the finger object H extends and the middle finger, the ring finger, and the little finger of the finger object H bend (for example, refer to the finger object H of FIG. 13). Further, when the control device 120 receives from the controller 320R an operation signal indicating that the trigger button 302*f* is pressed and the trigger button 302*e* is not pressed, the control unit 121 determines that the movement of the controller 320R satisfies the condition A.

When the control unit 121 determines whether or not the movement of the controller 320R satisfies the condition B, the control unit 121 identifies the relative position relationship between the HMD 110 and the controller 320R. Specifically, the control unit 121 acquires position information on the HMD 110 and position information on the controller 320R before movement based on data from the position sensor 130, to thereby acquire position information on the controller 320R before movement in the uvw coordinate system (relative positional relationship between the HMD 110 and the controller 320R before movement). Next, the control unit 121 acquires position information on the HMD 110 and position information on the controller 320R' after movement based on data from the position sensor 130, to thereby acquire position information of the controller 320R after movement in the uvw coordinate system (relative position relationship between the HMD 110 and the controller 320R after movement). Further, the control unit 121 acquires a period of time required for movement of the controller 320R. In this manner, the control unit 121 determines whether or not the movement amount of the controller 320R in the left direction (−u direction) within a predetermined period of time is equal to or more than the first movement amount based on the position information on the controller 320R before movement in the uvw coordinate system, the position information on the controller 320R after movement in the uvw coordinate system, and the period of time required for movement of the controller 320R. For example, the control unit 121 determines whether or not the movement amount of the controller 320R in the left direction within 1 second is equal to or more than an X cm.

Next, when the control unit 121 determines that the movement of the controller 320R satisfies the first condition (YES in Step S11), the menu object M and the finger object H are displayed in the visual-field image V in such a manner that the finger object H is in contact with a part of the menu object M (Step S12). Specifically, as in FIG. 12, the control unit 121 moves the menu object M and the finger object H in the left direction (−u direction) in such a manner that the finger object H is in contact with a part of the menu object M, to thereby arrange those objects in the visual field CV of the virtual camera 300. In this manner, the control unit 121 generates visual-field image data representing the visual-field image V in which the menu object M and the finger object H are displayed, to thereby display the visual-field image V as in FIG. 13 on the display unit 112 of the HMD 110 based on the generated visual-field image data. Thus, when the user U moves the controller 320R in the left direction so as to satisfy the first condition, the menu object M and the finger object H move in the left direction, and the finger object H and the menu object M are displayed at a predetermined position in the visual-field image V in such a manner that the finger object H is in contact with a part of the menu object M. When the controller 320R is moved after the menu object M and the finger object H are displayed in the visual-field image V, the finger object H moves in accordance with position information on the controller 320R in the uvw coordinate system. At this time, only the finger object H moves while the menu object M is fixed at a predetermined position.

In this manner, according to at least one embodiment, when the movement of the controller 320R (movement of the right hand of the user U) satisfies the first condition, the menu object M is displayed in the visual field CV of the virtual camera 300, and the menu object M is displayed in the visual-field image V displayed on the HMD 110. In this manner, the menu object M is displayed in association with movement of the right hand of the user U (movement of the controller 320R), and thus the user U can display the menu object M in the visual-field image V intuitively. Therefore, a display control method is capable of improving convenience of the user U in the virtual space 200.

In at least one embodiment, a description is given on the assumption that the first condition includes the condition A and the condition B, but the first condition may include only one of the condition A and the condition B. Further, the condition B specifies that the movement amount of the controller 320R in the left direction within the predetermined period of time is equal to or more than the first movement amount, but may specify that the movement amount of the controller 320R in an arbitrary direction (for example, right direction) other than the left direction within the predetermined period of time is equal to or more than the first movement amount. Further, the first movement amount may be changed appropriately depending on game content or the like.

Figure 14:
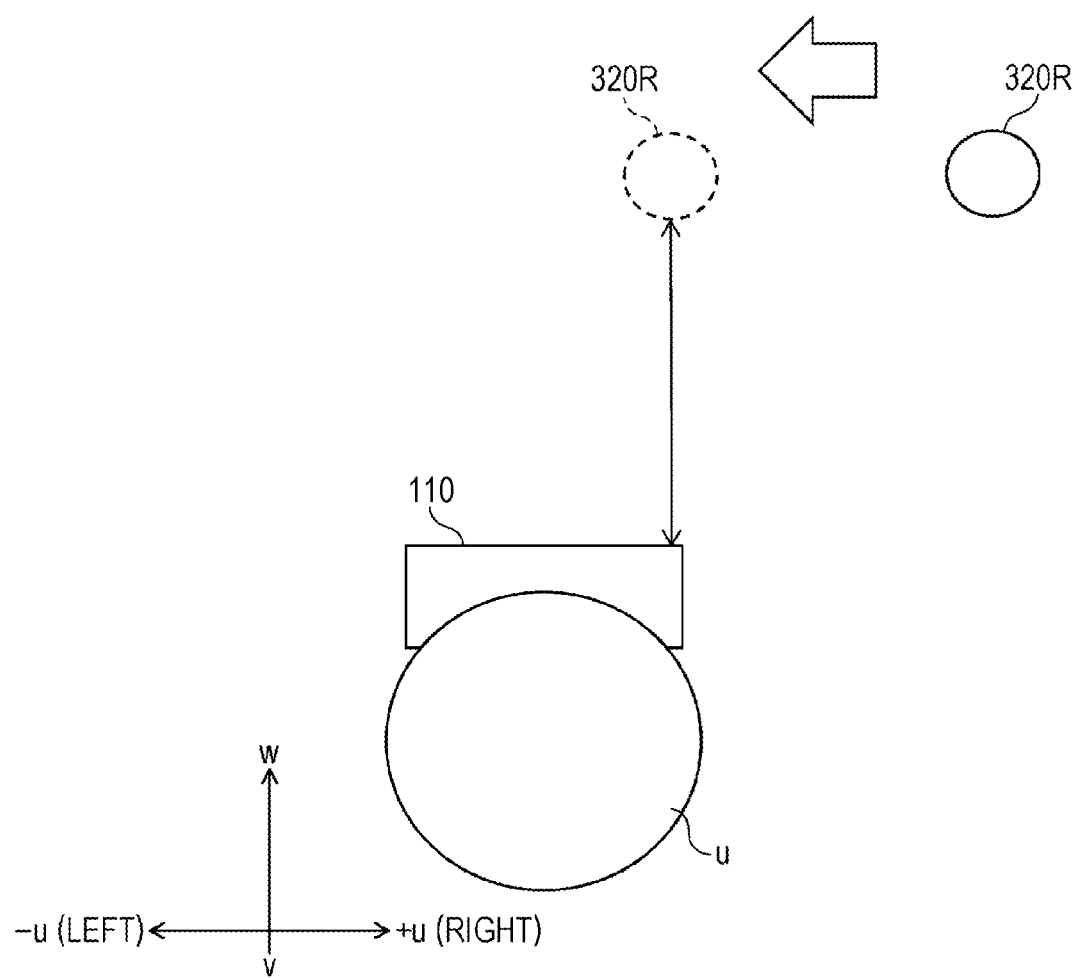
FIG. 14 is a diagram of a relative positional relationship between the HMD and the external controller, and movement of the external controller in the left direction according to at least one embodiment of this disclosure.
Figure 15:
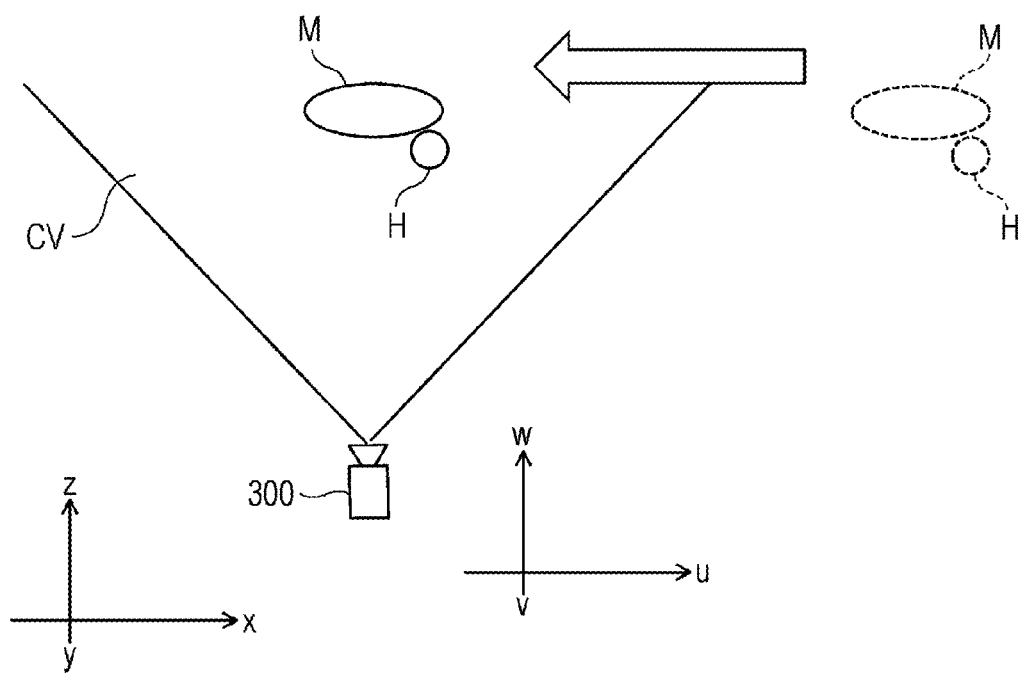
FIG. 15 is a diagram of a movement of the menu object and the finger object from outside the visual field of the virtual camera into the visual field according to at least one embodiment of this disclosure.

Further, sizes of the menu object M and the finger object H in the visual-field image V in FIG. 13 are determined based on distances between the virtual camera 300 and the menu object M and between the virtual camera 300 and the finger object H in a w-axis direction. Further, distances between the virtual camera 300 and the menu object M and between the virtual camera 300 and the finger object H in the w-axis direction are determined based on the distance between the HMD 110 and the controller 320R in the w-axis direction (that is, the relative position relationship between the HMD 110 and the controller 320R). For example, as in FIG. 11, when the distance between the controller 320R and the HMD 110 in the w-axis direction is small, the distances between the virtual camera 300 and the menu object M and between the virtual camera 300 and the finger object H in the w-axis direction are also small as illustrated in FIG. 12. As a result, the menu object M and the finger object H are displayed large in the visual-field image V. On the contrary, as in FIG. 14, when the distance between the controller 320R and the HMD 110 in the w-axis direction is large, the distances between the virtual camera 300 and the menu object M and between the virtual camera 300 and the finger object H in the w-axis direction are also large as in FIG. 15. As a result, the menu object M and the finger object H are displayed small in the visual-field image V.

In this manner, the control unit 121 determines the distances between the virtual camera 300 and the menu object M and between the virtual camera 300 and the finger object H in the w-axis direction based on the distance between the HMD 110 and the controller 320R in the w-axis direction (relative position relationship), and arranges the menu object M and the finger object H in the visual field CV of the virtual camera 300 based on the determined distances. After that, the control unit 121 generates visual-field image data, and displays the visual-field image V on the display unit 112 of the HMD 110 based on the generated visual-field image data.

According to at least one embodiment, the size of the menu object M to be displayed in the visual-field image V can be adjusted based on the distance between the HMD 110 and the right hand of the user U (controller 320R) in the w-axis direction, and thus it is possible to further improve convenience of the user U in the virtual space 200.

Figure 16:
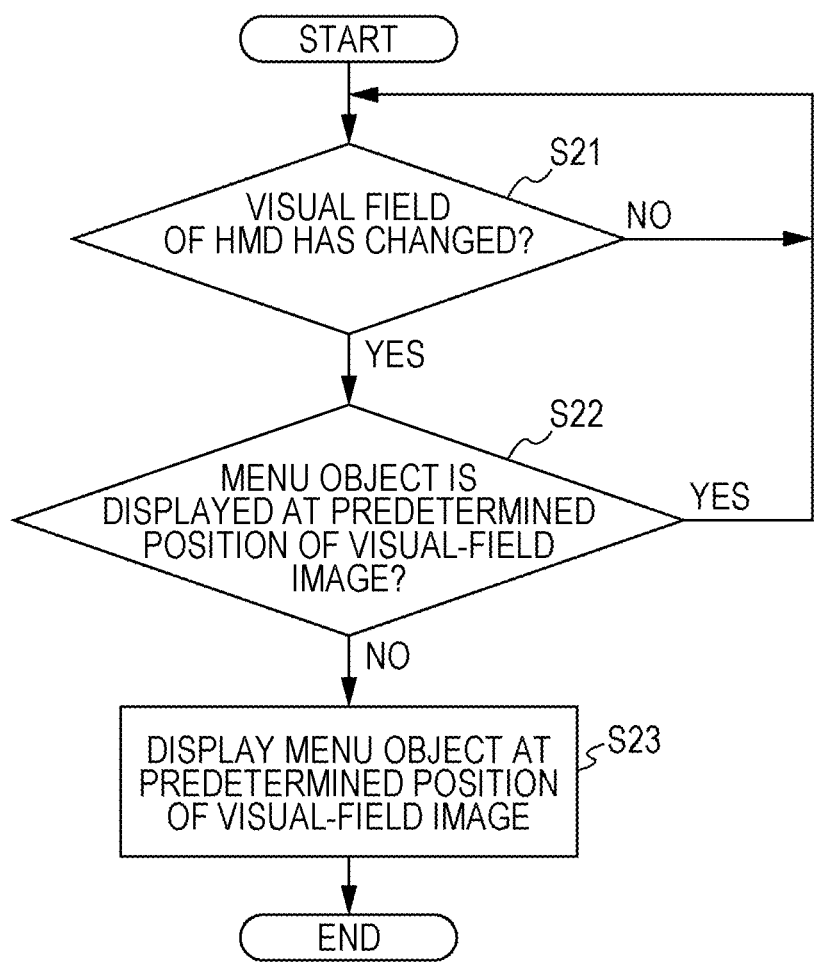
FIG. 16 is a flow chart of a movement of the menu object along with change of the visual field of the HMD such that the menu object is displayed at a predetermined position in the visual-field image according to at least one embodiment of this disclosure.
Figure 17:
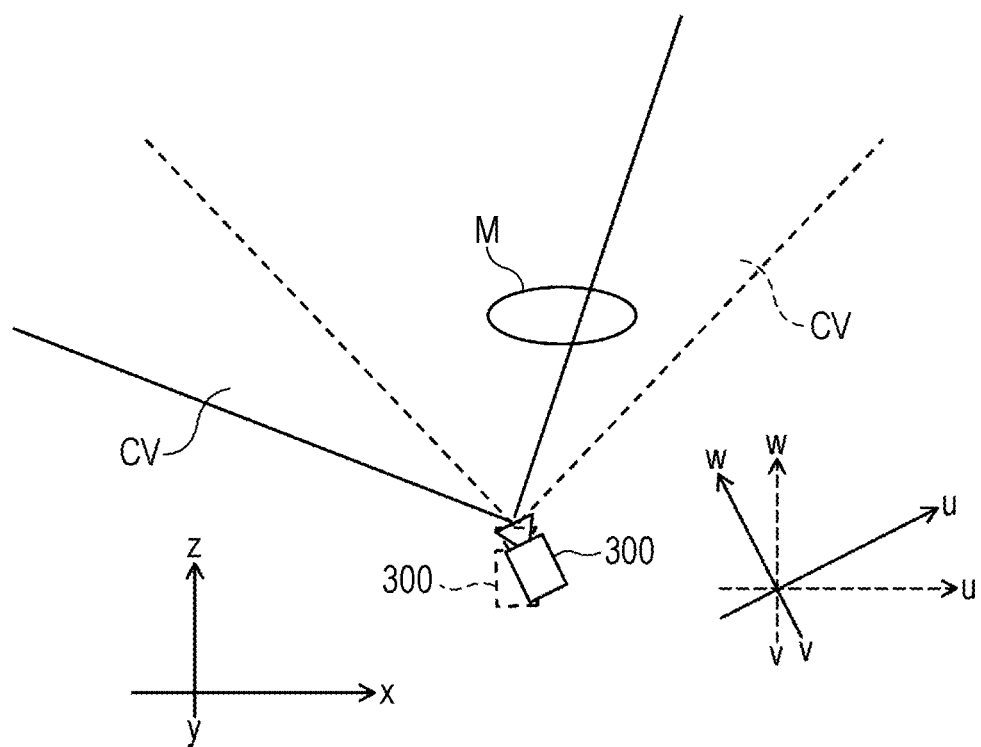
FIG. 17 is a diagram of a part of the menu object being positioned outside the visual field of the virtual camera as a result of movement of the visual field of the virtual camera according to at least one embodiment of this disclosure.
Figure 18:
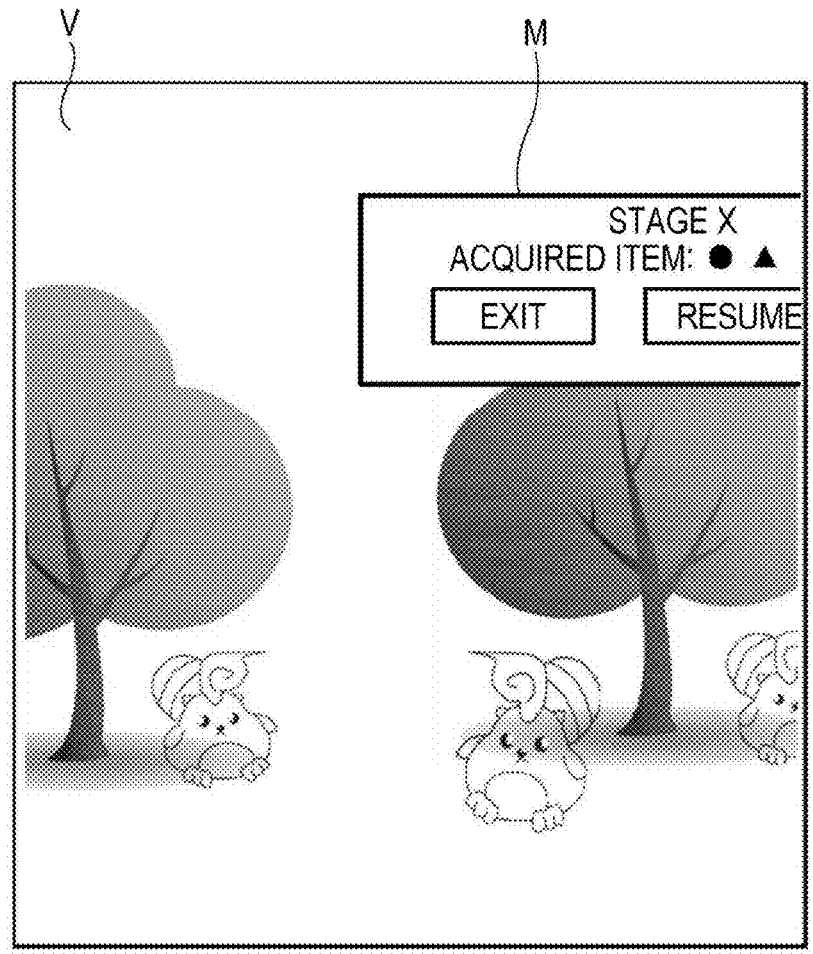
FIG. 18 is a diagram of a part of the menu object hidden from the visual-field image according to at least one embodiment of this disclosure.
Figure 19:
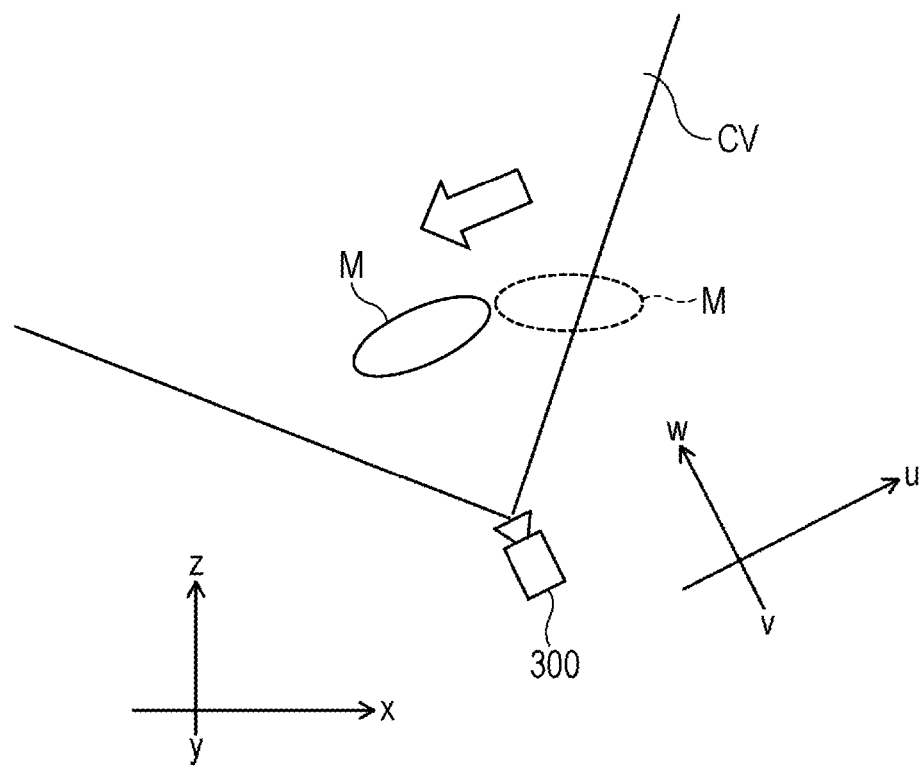
FIG. 19 is a diagram of a movement of the menu object to a predetermined position in the visual field of the virtual camera according to at least one embodiment of this disclosure.
Figure 20:
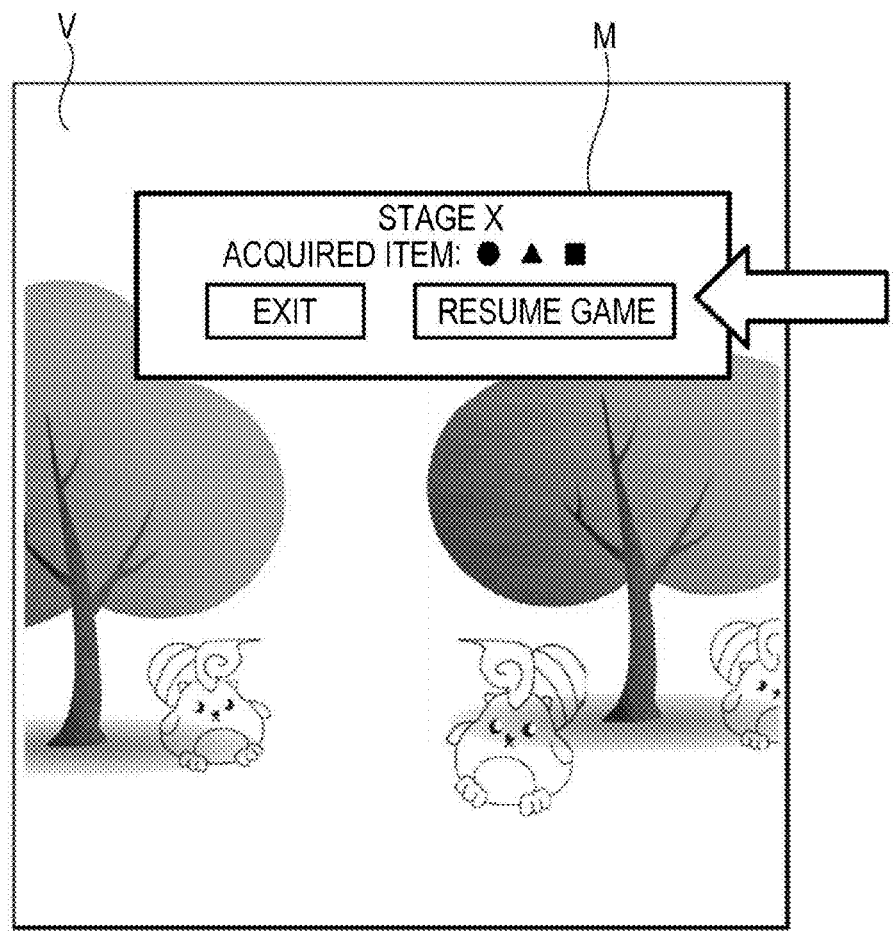
FIG. 20 is a diagram of a movement of the menu object such that the menu object is displayed at a predetermined position in the visual-field image according to at least one embodiment of this disclosure.

Next, with reference to FIG. 16 to FIG. 20, a description is given of processing of moving the menu object M in such a manner that the menu object M is displayed at a predetermined position in the visual-field image V along with change of the visual field CV of the HMD 110. FIG. 16 is a flow chart of a movement of the menu object M along with change of the visual field CV of the HMD 110 such that the menu object M is displayed at a predetermined position in the visual-field image V. FIG. 17 is a diagram of a part of the menu object M being positioned outside the visual field CV of the virtual camera 300 as a result of movement of the visual field CV of the virtual camera 300. FIG. 18 is a diagram of a part of the menu object M hidden from the visual-field image V. FIG. 19 is a diagram of movement of the menu object M to a predetermined position in the visual field CV of the virtual camera 300. FIG. 20 is a diagram of a movement of the menu object M such that the menu object M is displayed at a predetermined position in the visual-field image V.

In FIG. 16, in Step S21, the control unit 121 determines whether or not the visual field of the HMD 110 has changed. Specifically, the control unit 121 acquires information on the position and inclination of the HMD 110 based on data output from the HMD sensor 114 and/or the position sensor 130, and determines whether or not the visual field of the HMD 110 has changed based on the acquired information. When the control unit 121 determines that the visual field of the HMD 110 has changed (YES in Step S21), the control unit 121 determines whether or not the menu object M is displayed at a predetermined position in the visual-field image V (Step S22). On the other hand, when the control unit 121 determines that the visual field of the HMD 110 is not changed (NO in Step S21), the processing of Step S21 is executed repeatedly.

In at least one embodiment, in the initial state, the menu object M is arranged at a predetermined position (predetermined u coordinate and v coordinate) in the uvw coordinate system defined with the virtual camera 300 being a reference point as in FIG. 12 and FIG. 13 (in other words, the menu object M is arranged at the predetermined position in the visual field CV). On the other hand, as in FIG. 17, when rotational movement of the HMD 110 has caused rotational movement of the virtual camera 300 in the visual field CV, the menu object M is not arranged at the predetermined position, and a part of the menu object M is positioned outside the visual field CV. As a result, a part of the menu object M is not displayed in the visual-field image V (refer to FIG. 18).

In this manner, when the control unit 121 has determined that the menu object M is not displayed at the predetermined position in the visual-field image V (NO in Step S22), the control unit 121 moves the menu object M such that the menu object M is displayed at the predetermined position in the visual-field image V (Step S23). Specifically, as in FIG. 19, the control unit 121 moves the menu object M in the left direction (−u direction) such that the menu object M is arranged at a predetermined position of the visual field CV of the virtual camera 300. In this manner, as a result of the menu object M moving in the left direction (−u direction) in the visual-field image V, as in FIG. 20, the menu object M is displayed at the predetermined position in the visual-field image V. On the other hand, when "YES" is determined in Step S22, the processing returns to Step S21.

According to at least one embodiment, the menu object M moves along with movement of the visual field CV of the virtual camera 300 such that the menu object M is arranged at the predetermined position in the visual field CV of the virtual camera 300. In this manner, displaying the menu object M at the predetermined position in the visual-field image CV is possible without an additional user operation. That is, increasing convenience of the user U in the virtual space 200 is possible because there is no need for an additional operation for displaying the menu object M at the predetermined position every time the HMD 110 moves.

Figure 21:
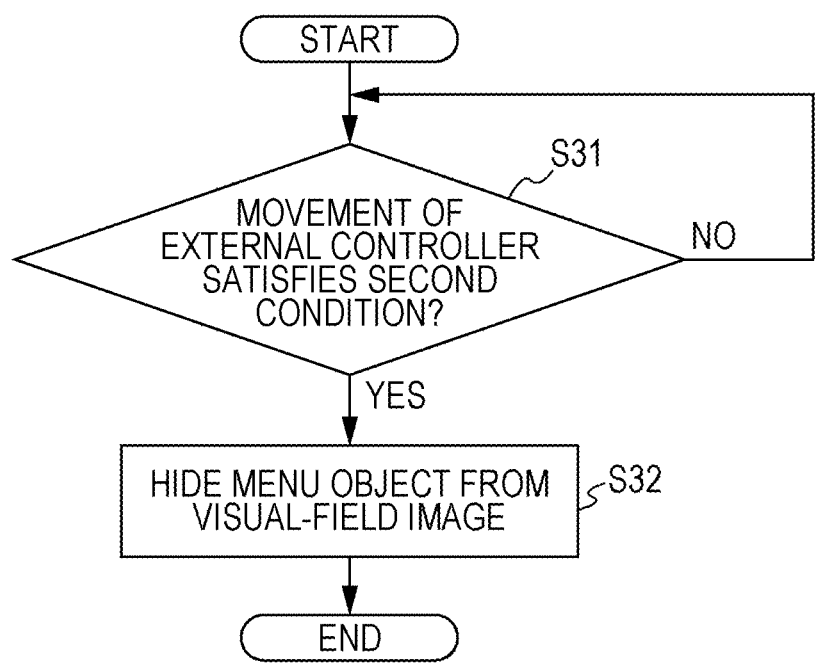
FIG. 21 is a flow chart of a method of hiding the menu object from the visual-field image according to at least one embodiment of this disclosure.
Figure 22:
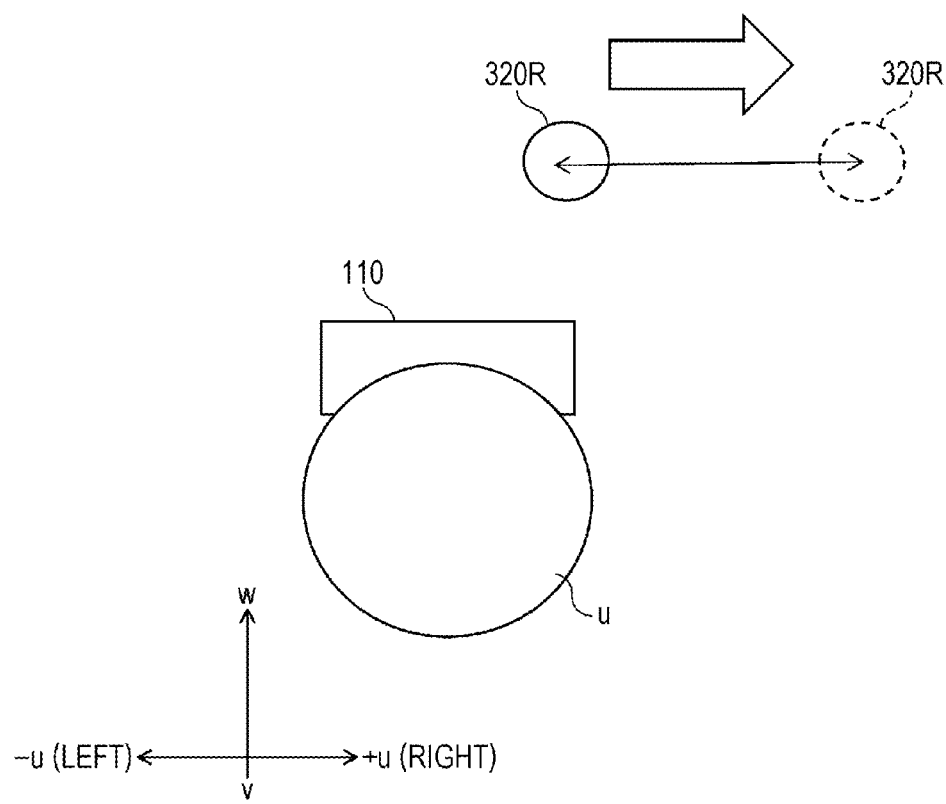
FIG. 22 is a diagram of a relative positional relationship between the HMD and the external controller, and movement of the external controller in a right direction according to at least one embodiment of this disclosure.
Figure 23:
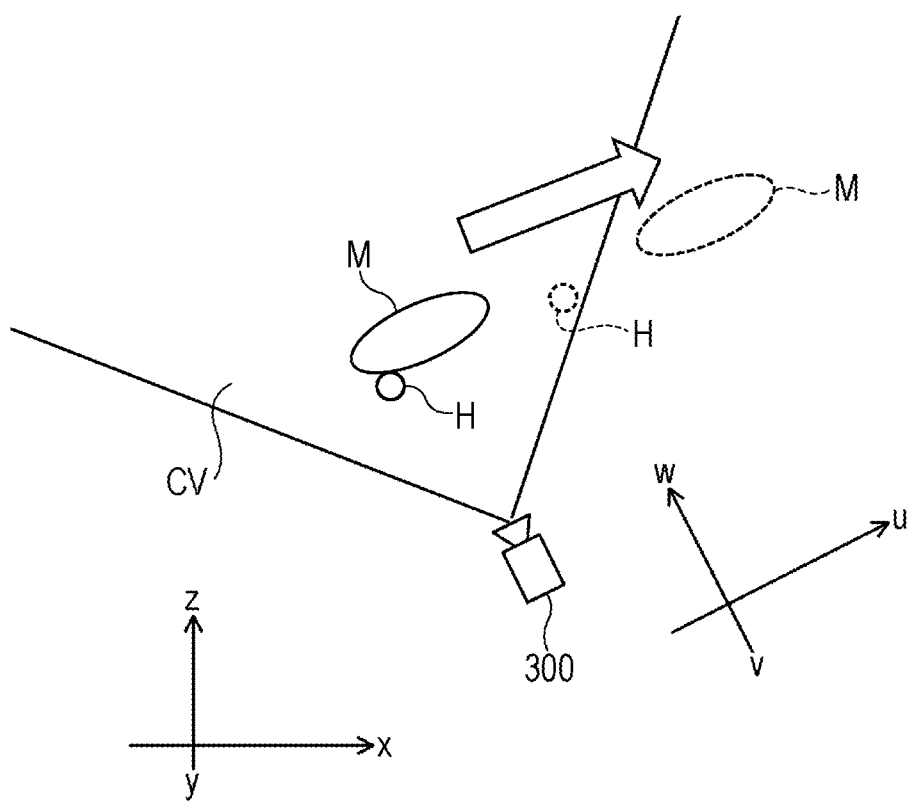
FIG. 23 is a diagram of a movement of the menu object from inside the visual field of the virtual camera to outside the visual field according to at least one embodiment of this disclosure.
Figure 24:
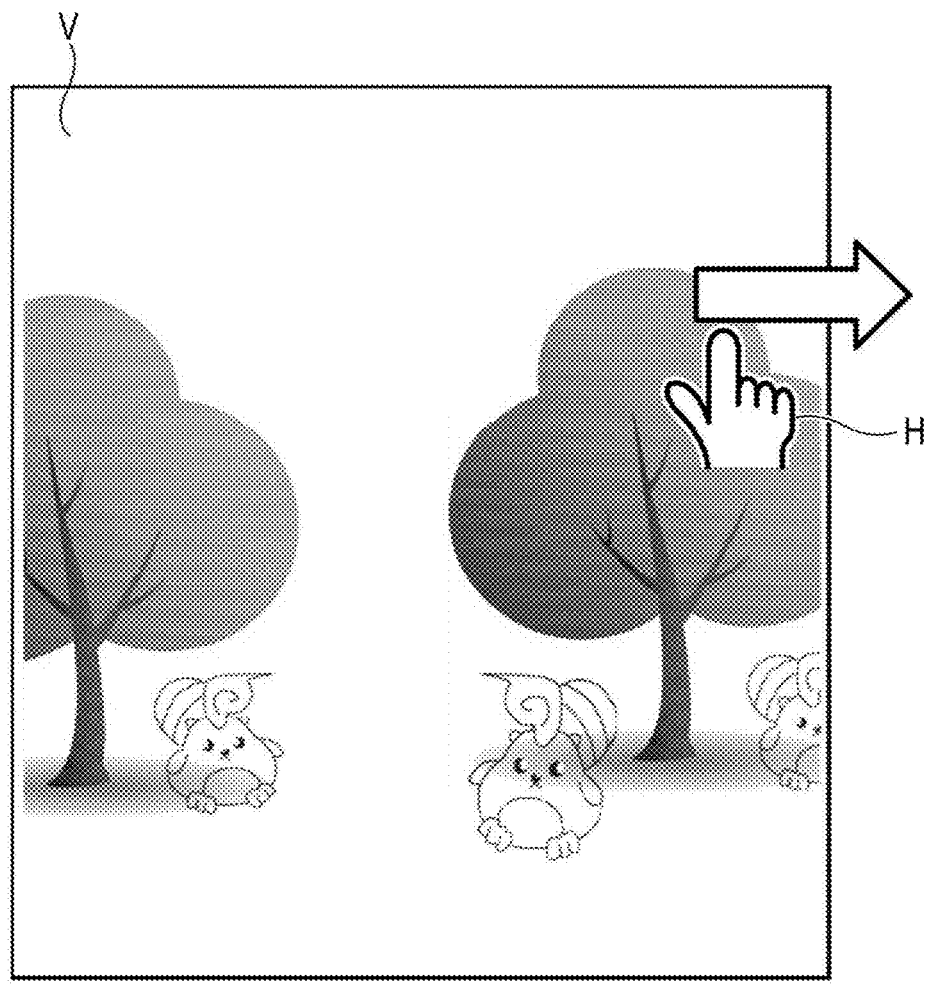
FIG. 24 is a diagram of a menu object that has disappeared from the visual-field image according to at least one embodiment of this disclosure.

Next, with reference to FIG. 21 to FIG. 24, a description is given of processing of hiding the menu object M from the visual-field image V. FIG. 21 is a flow chart for a method of hiding the menu object M from the visual-field image V. FIG. 22 is a diagram of a relative positional relationship between the HMD 110 and the external controller 320R, and movement of the external controller 320R in the right direction. FIG. 23 is a diagram of a movement of the menu object M from inside the visual field CV of the virtual camera 300 to outside the visual field CV. FIG. 24 is a diagram of a menu object M that has disappeared from the visual-field image V.

In FIG. 21, in Step S31, the control unit 121 determines whether or not the movement of the controller 320R satisfies a second condition.

<Second Condition>

The second condition includes a combination of a condition C and a condition D described below.

(Condition C) The trigger button 302e is not pressed while the trigger button 302f of the controller 320R is pressed (regardless of whether or not the push buttons 302a and 302b and the analog stick 302i are pressed at this time).

(Condition D) A movement amount of the controller 320R in the right direction (+u direction) within a predetermined period of time is equal to or more than a second movement amount under a state in which the finger object H is in contact with a part of the menu object M.

At this time, when the controller 320R satisfies the condition C, the index finger of the finger object H extends and the middle finger, the ring finger, and the little finger of the finger object H bend (for example, refer to the finger object H of FIG. 24).

Further, when the control device 120 receives from the controller 320R an operation signal indicating that the trigger button 302f is pressed and the trigger button 302e is not pressed, the control unit 121 determines that the movement of the controller 320R satisfies the condition C.

The control unit 121 first determines whether or not the finger object H is in contact with a part of the menu object M when determining whether or not the movement of the controller 320R satisfies the condition D. When the control unit 121 has determined that the finger object H is in contact with a part of the menu object M, the control unit 121 identifies the relative positional relationship between the HMD 110 and the controller 320R. Specifically, the control unit 121 acquires position information on the HMD 110 and position information on the controller 320R' before movement based on data from the position sensor 130, to thereby acquire position information on the controller 320R before movement in the uvw coordinate system (relative positional relationship between the HMD 110 and the controller 320R before movement). Next, the control unit 121 acquires position information on the HMD 110 and position information on the controller 320R' after movement based on data from the position sensor 130, to thereby acquire position information of the controller 320R after movement in the uvw coordinate system (relative positional relationship between the HMD 110 and the controller 320R after movement). Further, the control unit 121 acquires a period of time required for movement of the controller 320R. In this manner, the control unit 121 determines whether or not the movement amount of the controller 320R in the right direction (+u direction) within a predetermined period of time is equal to or more than the second movement amount based on the position information on the controller 320R before movement in the uvw coordinate system, the position information on the controller 320R' after movement in the uvw coordinate system, and the period of time required for movement of the controller 320R. For example, the control unit 121 determines whether or not the movement amount of the controller 320R in the right direction within 1 second is equal to or more than a Y cm.

Next, when determining that the movement of the controller 320R satisfies the second condition (YES in Step S31), the control unit 121 hides the menu object M from the visual-field image V (Step S32). Specifically, as in FIG. 23, the control unit 121 moves the menu object M and the finger object H in the right direction (+u direction) in such a manner that the finger object H is in contact with a part of the menu object M, to thereby arrange those objects outside the visual field CV of the virtual camera 300. In this manner, the control unit 121 generates visual-field image data representing the visual-field image V in which the menu object M is hidden, to thereby display the visual-field image V as in FIG. 24 on the display unit 112 of the HMD 110 based on the generated visual-field image data. Thus, when the user U moves the controller 320R in the right direction so as to satisfy the second condition, the menu object M and the finger object H move in the right direction, and the menu object M disappears from the visual-field image V (at this time, the finger object H may also disappear from the visual-field image V or may be displayed at the right end of the visual-field image V as in FIG. 24). When the user U moves the controller 320R in the right direction so as to satisfy the second condition, the menu object M may disappear without movement (that is, the menu object M may disappear instantaneously).

In at least one embodiment, when the movement amount of the controller 320R in the left direction (right-hand movement amount) is determined to be the first movement amount, the menu object M is displayed in the visual field CV of the virtual camera 300. On the contrary, when the movement amount of the controller 320R in the right direction (right-hand movement amount) is determined to be the second movement amount, the menu object M is hidden from the visual field CV of the virtual camera 300. That is, the menu object M may be displayed in the visual-field image V in accordance with the right-hand movement amount in the left direction, while the menu object M may be hidden from the visual-field image V in accordance with the right-hand movement amount in the right direction. In this manner, the menu object M can be displayed/hidden in association with the right-hand movement of the user U, which enables the user U to display the menu object M in the visual-field image V intuitively. Therefore, a display control method is capable of increasing convenience of the user U in the virtual space 200.

In at least one embodiment, a description is given on the assumption that the second condition includes the condition C and the condition D, but the second condition may include only one of the condition C and the condition D. Further, the condition D specifies that the movement amount of the controller 320R in the right direction within the predetermined period of time is equal to or more than the second movement amount, but may specify that the movement amount of the controller 320R in an arbitrary direction (for example, downward direction (−v direction)) other than the right direction within the predetermined period of time is equal to or more than the second movement amount. Further, the second movement amount may be changed appropriately depending on game content or the like.

Figure 25:
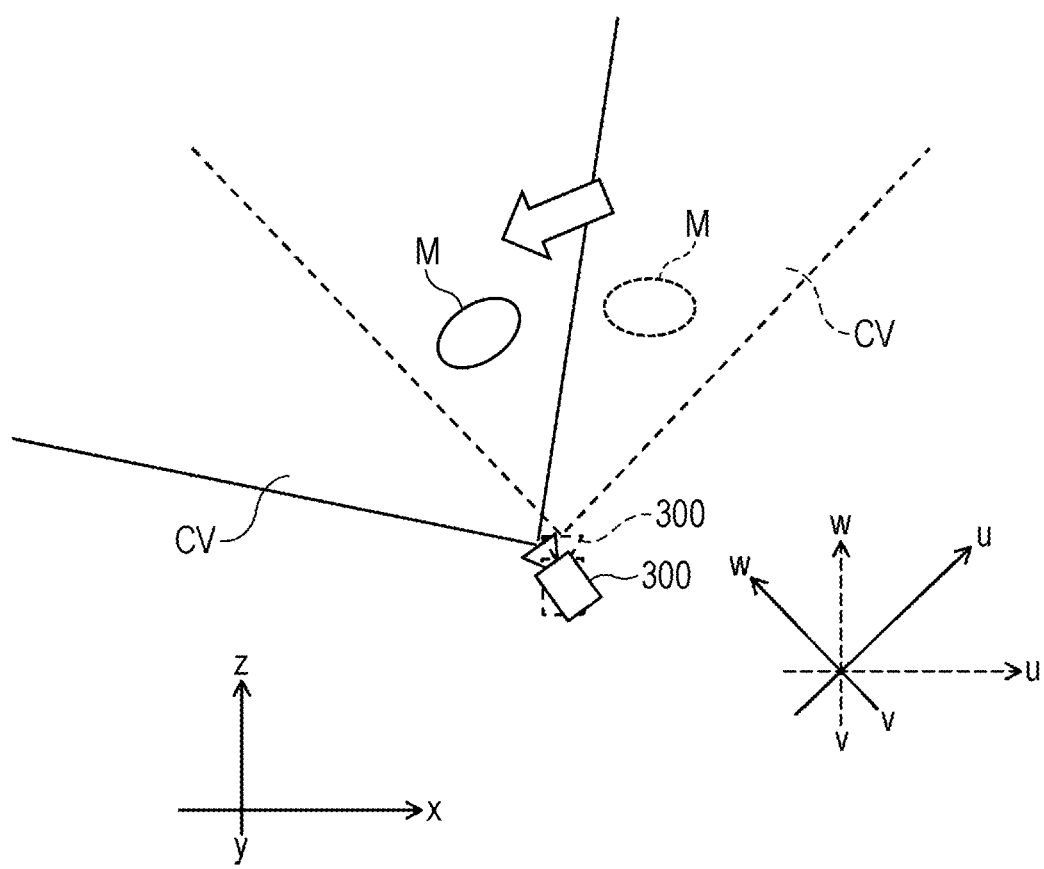
FIG. 25 is a diagram of a menu object moving from outside the visual field of the virtual camera into the visual field according to at least one embodiment of this disclosure.

Next, a description is given of processing of moving the menu object M that is positioned outside the visual field CV of the virtual camera 300 into the visual field CV of the virtual camera 300 with reference to FIG. 25. FIG. 25 is a diagram of a menu object M moving from outside the visual field CV of the virtual camera 300 into the visual field CV. First, the control unit 121 determines whether or not the menu object M is positioned outside the visual field CV of the virtual camera 300. In FIG. 25, the menu object M may be positioned outside the visual field CV of the virtual camera 300 due to rotational movement of the virtual camera 300 that is caused along with rotational movement of the HMD 110.

Next, when the control unit 121 determines that the menu object M is positioned outside the visual field CV of the virtual camera 300, the control unit 121 moves the menu object M in the left direction (−u direction) as in FIG. 25 such that the menu object M is arranged in the visual field CV of the virtual camera 300. The control unit 121 may move the menu object M such that the menu object M is arranged at the predetermined position in the visual field CV, or may move the menu object M such that at least a part of the menu object M is arranged in the visual field CV.

According to at least one embodiment, even when the menu object M is not displayed temporarily in the visual-field image V along with movement of the HMD 110, the menu object M can be displayed in the visual-field image V without an additional user operation by moving the menu object M such that the menu object M is positioned in the visual field CV. In other words, convenience of the user U in the virtual space 200 is increased because there is no need for an additional operation for displaying the menu object M in the visual-field image V every time the menu object M is not displayed temporarily in the visual-field image V along with movement of the HMD 110.

In order to achieve various types of processing to be executed by the control unit 121, a display control system for executing a display control method of this embodiment may be installed in advance into the storage unit 123 or the ROM. Alternatively, instructions for the display control system may be stored in a computer-readable storage medium, for example, a magnetic disk (HDD, a floppy disk), an optical disc (for example, CD-ROM, DVD-ROM, and Blu-ray disc), a magneto-optical disk (for example, MO), and a flash memory (for example, an SD card, a USB memory, and an SSD). In this case, the storage medium is connected to the control device 120, and thus the program stored in the storage medium is installed into the storage unit 123. Then, the display control system includes instructions installed in the storage unit 123 is loaded onto the RAM, and the processor executes the loaded program. In this manner, the control unit 121 executes the display control method of at least one embodiment.

Further, the display control system may include instructions downloaded from a computer on the communication network 3 via the communication interface 125. Also in this case, the downloaded program is similarly installed into the storage unit 123.

The description of the described at least one embodiment is not to be read as a restrictive interpretation of the technical scope of this disclosure. The at least one embodiment is merely given as an example, and a person skilled in the art would understand that various modifications can be made to the at least one embodiment within the scope of this disclosure set forth in the appended claims. Thus, the technical scope of this disclosure is to be defined based on the scope of this disclosure set forth in the appended claims and an equivalent scope thereof.

In at least one embodiment, a description has been given of an example of displaying/hiding the menu object M in/from the visual-field image V in accordance with the movement amount of the controller 320R in the left direction/right direction. However, at least one embodiment is not limited to this configuration. For example, the menu object M may be displayed/hidden in/from the visual-field image V in accordance with the movement amount of the left-hand external controller 320L (hereinafter simply referred to as "controller 320L") in the right direction/left direction.

Further, in at least one embodiment, the menu object M is displayed/hidden in/from the visual-field image V in association with movement of the controller 320R representing the right-hand movement of the user U. However, the menu object M may be displayed/hidden in accordance with the movement amount of the right hand or the left hand itself of the user U. For example, through use of a glove device or a ring device worn on fingers of the user instead of the external controller, the position sensor 130 can detect the position and movement amount of one hand of the user U, and can also detect movement or states of fingers of one hand of the user U. Further, through use of an external camera to take an image of fingers of the user, it is possible to detect the position and movement amount of one hand of the user U without the user directly wearing some device on his or her fingers, and also detect movement or states of fingers of one hand of the user U. In this manner, the control unit 121 may determine whether or not the movement of one hand (right hand or left hand) of the user U satisfies the first condition, and display the menu object M in the visual-field image V when the movement of one hand satisfies the first condition. Similarly, the control unit 121 may determine whether or not the movement of one hand of the user U satisfies the second condition, and hide the menu object M from the visual-field image V when the movement of one hand satisfies the second condition.

What is claimed is:

1. A display control method comprising:
   generating virtual space data representing a virtual space in which a virtual camera is arranged, wherein the virtual space includes a virtual hand;
   moving a visual field of the virtual camera along with movement of a head-mounted display (HMD);
   generating visual-field image data based on the visual field of the virtual camera and the virtual space data;
   detecting movement of a user's hand;
   moving the virtual hand in the virtual space in response to the detected movement of the user's hand;
   displaying a visual-field image on the HMD based on the visual-field image data;
   determining whether or not a detected movement of the user's hand satisfies a first condition, wherein the first condition includes a movement of the user's hand from inside of a detectable area in real space to outside of the detectable area in real space, the movement of the user's hand including at least a predetermined movement amount within a predetermined movement time; and displaying a menu object in the visual field of the virtual camera based on a relative position relationship between the virtual hand and the virtual camera, wherein the menu object disappears from the visual field of the virtual camera and the virtual hand continues to be displayed within the visual field of the virtual camera in response to the detected movement of the user's hand satisfying the first condition.

2. The display control method according to claim 1, further comprising determining a distance between the menu object and the virtual camera in accordance with the relative position relationship,
wherein displaying the menu object comprises displaying the menu object in the visual field of the virtual camera based on the determined distance between the menu object and the virtual camera.

3. The display control method according to claim 2, further comprising arranging a finger object in the virtual space based on states of fingers of the user and the relative positional relationship,
wherein displaying the menu object comprises displaying the menu object in the visual field of the virtual camera in such a manner that the finger object and the menu object are in contact with each other.

4. The display control method according to claim 3, further comprising:
determining whether or not the menu object is positioned outside the visual field of the virtual camera; and
moving the menu object such that at least a part of the menu object is arranged in the visual field of the virtual camera when the menu object is determined to be positioned outside the visual field of the virtual camera.

5. The display control method according to claim 3, further comprising moving the menu object along with movement of the visual field of the virtual camera such that the menu object is positioned at a predetermined position in the visual field of the virtual camera when the menu object is arranged in the visual field of the virtual camera.

6. The display control method according to claim 2,
wherein determining whether or not the detected movement amount satisfies the first condition comprises determining whether or not the detected movement amount of the virtual hand in a first direction is equal to or more than a first movement amount,
wherein displaying the menu object comprises displaying the menu object in the visual field of the virtual camera when the detected movement amount of the virtual hand in the first direction is equal to or more than the first movement amount, and
wherein the display control method further comprises:
determining whether or not a detected movement amount of the virtual hand in a second direction, which is a direction different from the first direction, is equal to or more than a second movement amount; and
hiding the menu object from the visual field of the virtual camera when the detected movement amount of the virtual hand in the second direction is equal to or more than the second movement amount.

7. The display control method according to claim 2, further comprising:

determining whether or not the menu object is positioned outside the visual field of the virtual camera; and
moving the menu object such that at least a part of the menu object is arranged in the visual field of the virtual camera when the menu object is determined to be positioned outside the visual field of the virtual camera.

8. The display control method according to claim 2, further comprising moving the menu object along with movement of the visual field of the virtual camera such that the menu object is positioned at a predetermined position in the visual field of the virtual camera when the menu object is arranged in the visual field of the virtual camera.

9. The display control method according to claim 1, further comprising arranging a finger object in the virtual space based on states of fingers of the user and the relative positional relationship,
wherein displaying the menu object comprises displaying the menu object in the visual field of the virtual camera in such a manner that the finger object and the menu object are in contact with each other.

10. The display control method according to claim 9,
wherein determining whether or not the detected movement amount satisfies the first condition comprises determining whether or not the detected movement amount of the virtual hand in a first direction is equal to or more than a first movement amount,
wherein displaying the menu object comprises displaying the menu object in the visual field of the virtual camera when the detected movement amount of the virtual hand in the first direction is equal to or more than the first movement amount, and
wherein the display control method further comprises:
determining whether or not a detected movement amount of the virtual hand in a second direction, which is a direction different from the first direction, is equal to or more than a second movement amount; and
hiding the menu object from the visual field of the virtual camera when the detected movement amount of the virtual hand in the second direction is equal to or more than the second movement amount.

11. The display control method according to claim 9, further comprising:
determining whether or not the menu object is positioned outside the visual field of the virtual camera; and
moving the menu object such that at least a part of the menu object is arranged in the visual field of the virtual camera when the menu object is determined to be positioned outside the visual field of the virtual camera.

12. The display control method according to claim 9, further comprising moving the menu object along with movement of the visual field of the virtual camera such that the menu object is positioned at a predetermined position in the visual field of the virtual camera when the menu object is arranged in the visual field of the virtual camera.

13. The display control method according to claim 1,
wherein determining whether or not the detected movement amount satisfies the first condition comprises determining whether or not the detected movement amount of the virtual hand in a first direction is equal to or more than a first movement amount,
wherein displaying the menu object comprises displaying the menu object in the visual field of the virtual camera when the detected movement amount of the virtual hand in the first direction is equal to or more than the first movement amount, and
wherein the display control method further comprises:

determining whether or not a detected movement amount of the virtual hand in a second direction, which is a direction different from the first direction, is equal to or more than a second movement amount; and hiding the menu object from the visual field of the virtual camera when the detected movement amount of the virtual hand in the second direction is equal to or more than the second movement amount.

14. The display control method according to claim 13, further comprising moving the menu object along with movement of the visual field of the virtual camera such that the menu object is positioned at a predetermined position in the visual field of the virtual camera when the menu object is arranged in the visual field of the virtual camera.

15. The display control method according to claim 1, further comprising:
determining whether or not the menu object is positioned outside the visual field of the virtual camera; and
moving the menu object such that at least a part of the menu object is arranged in the visual field of the virtual camera when the menu object is determined to be positioned outside the visual field of the virtual camera.

16. The display control method according to claim 1, further comprising moving the menu object along with movement of the visual field of the virtual camera such that the menu object is positioned at a predetermined position in the visual field of the virtual camera when the menu object is arranged in the visual field of the virtual camera.

17. A system comprising:
a processor; and
a non-transitory computer readable medium connected to the processor, the non-transitory computer readable medium is configured to store instructions, and the processor is configured to execute the instructions for:
generating virtual space data representing a virtual space in which a virtual camera is arranged;
generating instructions for moving a visual field of the virtual camera along with movement of a head-mounted display (HMD);
generating visual-field image data based on the visual field of the virtual camera and the virtual space data;
generating instructions for displaying a visual-field image on the HMD based on the visual-field image data;
identifying a relative position relationship between the HMD and a user's hand;
determining whether or not a detected movement of the user's hand satisfies a first condition, wherein the first condition includes a movement of the user's hand from inside of a detectable area in real space to outside of the detectable area in real space, the movement of the user's hand including at least a predetermined movement amount within a predetermined movement time;
generating instructions for displaying a menu object in the visual field of the virtual camera based on the relative position relationship, wherein the menu object disappears from the visual field of the virtual camera and a virtual hand, corresponding to the user's hand, continues to be displayed within the visual field of the virtual camera in response to the detected movement of the user's hand satisfying the first condition;
moving the visual field based on a detected movement of the HMD; and
automatically moving the menu to be within the visual field in response to a determination that the menu is at least partially outside of the visual field.

18. A non-transitory computer-readable medium with an executable program stored thereon, wherein a processor is configured to execute the executable program to perform the following:
generating virtual space data representing a virtual space in which a virtual camera is arranged;
moving a visual field of the virtual camera along with movement of a head-mounted display (HMD);
generating visual-field image data based on the visual field of the virtual camera and the virtual space data;
displaying a visual-field image on the HMD based on the visual-field image data;
identifying a relative position relationship between the HMD and a user's hand;
determining whether or not a detected movement of the user's hand satisfies a first condition, wherein the first condition includes a movement of the user's hand from inside of a detectable area in real space to outside of the detectable area in real space, the movement of the user's hand including at least a predetermined movement amount within a predetermined movement time;
displaying a menu object at a predetermined position in the visual field of the virtual camera based on the relative position relationship, wherein the menu object disappears from the visual field of the virtual camera and a virtual hand continues to be displayed within the visual field of the virtual camera in response to the detected movement of the user's hand satisfying the first condition;
moving the visual field based on a detected movement of the HMD; and
moving the menu to the predetermined position in the visual field in response to a determination that the menu is at least partially outside of the visual field.

* * * * *